United States Patent
Lohmann et al.

(12)

(10) Patent No.: US 6,730,366 B2
(45) Date of Patent: May 4, 2004

(54) PROCESS FOR MODIFYING A SURFACE

(75) Inventors: Dieter Lohmann, Münchenstein (CH); Peter Chabrecek, Riehen (CH); Jörg Leukel, Freiburg (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 10/056,168

(22) Filed: Jan. 24, 2002

(65) Prior Publication Data

US 2002/0172831 A1 Nov. 21, 2002

(30) Foreign Application Priority Data

Jan. 24, 2001 (EP) .............................. 01810061

(51) Int. Cl.$^7$ .......................... C23C 14/28; B05D 3/06; B32B 17/10
(52) U.S. Cl. ...................... 427/553; 427/558; 427/2.24; 428/411.1
(58) Field of Search ................ 427/553, 558, 427/2.24; 488/411.1

(56) References Cited

U.S. PATENT DOCUMENTS

| 4,309,453 | A |   | 1/1982 | Reiner et al. ............... 427/54.1 |
| 4,987,032 | A | * | 1/1991 | Miyasaka et al. ......... 428/411.1 |
| 5,648,186 | A | * | 7/1997 | Daroux et al. ............... 429/308 |
| 6,090,995 | A | * | 7/2000 | Reich et al. ............... 623/23.76 |
| 6,280,760 | B1 | * | 8/2001 | Meyer et al. ............... 424/423 |

FOREIGN PATENT DOCUMENTS

| JP | 63041541 |   | 2/1988 |
| JP | 05310979 |   | 11/1993 |
| WO | WO 99/57581 |   | 11/1999 |
| WO | WO 9957581 A | * | 11/1999 |
| WO | WO 02/32590 |   | 4/2002 |

OTHER PUBLICATIONS

International Search Report.
European Search Report.
XP 002169462 (Abs).

* cited by examiner

Primary Examiner—Brian K. Talbot
Assistant Examiner—Elena Tsoy
(74) Attorney, Agent, or Firm—Jian S. Zhou; R. Scott Meece; Robert J. Gorman

(57) ABSTRACT

The invention relates to a process for coating a material surface comprising the steps of:

(a) applying to the material surface one or more different comb-type polymers comprising a polymer backbone and side chains pendently attached thereto, wherein at least a part of the side chains carry a triggerable precursor for carbene or nitrene formation; and (b) fixing the polymer(s) onto the material surface using heat or radiation, in particular radiation such as UV or visible light.

The polymers of the invention are useful for the modification of material surfaces and are particularly suitable for providing biomedical articles such as contact lenses with a hydrophilic coating.

9 Claims, No Drawings

PROCESS FOR MODIFYING A SURFACE

CROSS-REFERENCE TO RELATED APPLICATIONS

This application claims the benefit under 35 U.S.C. §119 of European patent application No. 01810061.0 filed Jan. 24, 2001.

The present invention relates to a process for coating articles, wherein the coating comprises a polymer having desirable characteristics regarding adherence to the substrate, durability, softness, hydrophilicity, lubricity, wettability, biocompatibility and permeability. More particular, the present invention relates to a process for coating an article, such as a biomedical material or article, especially ophthalmic devices such as ocular implants, artificial corneas and contact lenses including an extended-wear contact lens, wherein at least a part of the coating comprises a polymer having a "bottle-brush" or comb type structure. The inventive coatings are obtainable from novel preformed comb-type polymers having photoreactive groups linked pendently to the polymer backbone by applying them onto a substrate surface and then fixing them using irradiation. The resulting coatings are composed of hairy highly hydrophilic polymer chains or highly branched polymer chains which form covalently bound and loosely crosslinked highly water containing networks with an overall large void volume.

BACKGROUND OF THE INVENTION

A variety of different types of processes for preparing hydrophilic polymeric coatings on an "inert" hydrophobic substrate have been disclosed in the prior art. For example, WO 99/57581 discloses to first of all provide the article surface with covalently bound photoinitiator molecules, coating the modified surface with a layer of a polymerizable macromonomer and then subjecting it to a heat or radiation treatment whereby the macromonomer is graft polymerized thus forming the novel article surface. The known surface modification process is applicable only to articles having a functionalized surface, that is to say, the surface of the article either inherently contains functional groups or the functional groups have to be introduced previously by a plasma treatment or the like.

A plasma treatment as part of a high volume production requires a considerable investment in equipment and is furthermore difficult to be integrated in an automated production process. For example, a plasma treatment requires usually high vacuum conditions; in addition the article to be treated must be dry before exposure to the plasma. Thus, a polymeric article such as a contact lens that is wet from prior hydration or extraction must be dried previously, thereby adding time in the overall lens production process as well as imposing added costs of obtaining a drying equipment. In addition, drying a hydrogel type contact lens often affects its shape and optical quality in an irreversible manner. Therefore, it would be highly desirable to initiate the covalent binding of a hydrophilic layer to an "inert" surface such that the plasma treatment is avoided and replaced by a technique which is easy to perform with standard equipment under ambient conditions, and which is thus more feasible for an automated production process.

Surprisingly, now there have been found novel branched reactive polymer derivatives which are able to react with the surface of articles being devoid of functional groups. By means of said novel polymers it is possible to obtain articles, particularly biomedical devices such as, for example, contact lenses, with an improved wettability, water-retention ability, surface lubricity and biocompatibility as well as high wearing comfort and longterm overall on-eye performance.

SUMMARY OF THE INVENTION

The present invention therefore in one aspect relates to a process for coating a material surface comprising the steps of:

(a) applying to the material surface one or more different comb-type polymers comprising a polymer backbone and side chains pendently attached thereto, wherein at least a part of the side chains carry a triggerable precursor for carbene or nitrene formation; and (b) fixing the polymer(s) onto the material surface using heat or radiation, in particular radiation such as UV or visible light.

The polymers that are useful in the process of the invention are novel and represent a further object of the invention.

The backbone of the polymers according to step (a) of the process may be, for example, a polyvinyl homo- or copolymer, a polyethylene imine, a polypeptide, a polyether or a polysaccharide. Examples of suitable side chains that are attached to the polymer backbone are functional hydrophilic homo- or cotelomers, polyalkylene oxides, oligosaccharides or oligopeptides, and at least a part of said side chains carry at least one triggerable precursor for carbene or nitrene formation.

DETAILED DESCRIPTION OF THE INVENTION

The comb-type polymer according to step (a) of the process is, for example, (I) a polyvinyl polymer comprising, for example, units of the formula

(1a)

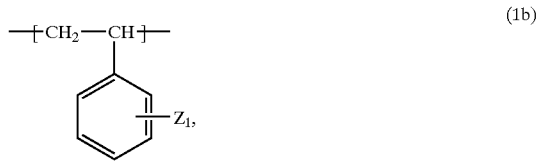

(1b)

wherein R is hydrogen or $C_1$–$C_4$-alkyl and $Z_1$ is a hydrophilic side chain comprising at least one one triggerable precursor for carbene or nitrene formation and having a weight average molecular weight of $\geq 200$; or (II) a polyethylene imine comprising units of formula

(1c)

wherein $Z_2$ is a hydrophilic side chain comprising at least one triggerable precursor for carbene or nitrene formation and having a weight average molecular weight of $\geq 200$; or (III) a polypeptide comprising units of formula

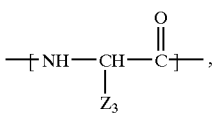
(1d)

wherein $Z_3$ is a hydrophilic side chain comprising at least one triggerable precursor for carbene or nitrene formation and having a weight average molecular weight of $\geq 200$ (IV) a polyether comprising, for example, units of formula

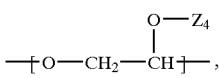
(1e)

wherein $Z_4$ is a hydrophilic side chain comprising at least one triggerable precursor for carbene or nitrene formation and having a weight average molecular weight of $\geq 200$, or (V) a polysaccharide comprising saccharide units to which is attached a side chain $Z_5$ comprising at least one triggerable precursor for carbene or nitrene formation and having a weight average molecular weight of $\geq 200$.

A suitable side chain $Z_1$ of the vinyl polymers (I) is, for example, of formula

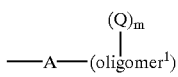
(2)

wherein
A is a radical of formula

—C(O)—X—      (2a),

—C(O)—O—(CH$_2$)$_r$—CH(OH)—CH$_2$—X—      (2b),

—C(O)—NH—(alk')—C(O)—X—      (2c),

—C(O)—O—(alk")—NH—C(O)—X—      (2d),

—C(O)—X—(alk")—X$_1$—C(O)—      (2e),

—C(O)—NH—C(O)—X—      (2f),

—(alk''')$_s$—X—D—X$_1$—      (2g),

—X—(alk')—X$_1$—      (2h),

—X—C(O)—      (2i),

—(alk''')—C(O)—X—      (2j)

or

—(alk''')—X—C(O)—      (2k), (alk') is $C_1$–$C_6$-alkylene; (alk") is $C_2$–$C_{12}$-alkylene; (alk''') is $C_1$–$C_6$-alkylene; D is a group $\leq$C(O)— or —C(S)— and s is 0 or 1;

X and $X_1$ are each independently a group —O— or —NR$_1$—, wherein $R_1$ is hydrogen or $C_1$–$C_4$-alkyl;

(oligomer$^1$) is the radical of
(i) a hydrophilic telomer which is derived from one or more different copolymerizable vinyl monomers,
(ii) the radical of an oligosaccharide;
(iii) the radical of an oligopeptide; or
(iv) the radical of a polyalkylene oxide;

Q is a radical comprising a triggerable precursor for carbene or nitrene formation;

r is an integer from 1 to 4; and m is an integer $\geq 1$.

Formulae (2a)–(2k) are to be understood, that the left bond is in each case directed to the C-atom of the polymer backbone, and the right bond is directed to (oligomer$^1$).

R is preferably hydrogen or methyl.

In case that X is a group —NR$_1$—, $R_1$ is preferably hydrogen, methyl or ethyl, in particular hydrogen. X and $X_1$ are each independently preferably a group —O— or —NH—. X and $X_1$ in formula (2e) are each preferably a group —O—.

(alk") is preferably $C_2$–$C_6$-alkylene, more preferably $C_2$–$C_4$-alkylene and particularly preferably 1,2-ethylene.

(alk') is preferably methylene, 1,2-ethylene or 1,1-dimethyl-methylene, in particular a radical —CH$_2$— or —C(CH$_3$)$_2$—.

(alk''') is preferably $C_1$–$C_4$-alkylene, more preferably $C_1$–$C_2$-alkylene and in particular methylene.

r is preferably the number 2 or 3, in particular 2.

Variable A is preferably a radical of the above formula (2a), (2c), (2d), (2i) or (2k), wherein the above given meanings and preferences apply for the variables contained therein. Variable A is particularly preferably a radical of the above formula (2a), (2d) or (2k), wherein X is —NH—, (alk") is 1,2-ethylene, and (alk''') is methylene.

(oligomer$^1$) as a telomer radical (i) is, for example, of formula

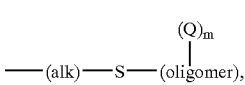
(3)

wherein for (alk) independently the meanings and preferences given above for (alk") apply and (oligomer)-(Q)$_m$ corresponds, for example, to formula

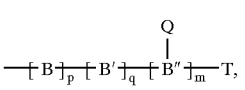
(3a)

wherein B and B' are each independently of the other a 1,2-ethylene radical derivable from a copolymerizable vinyl monomer that is substituted by a hydrophilic substituent by replacing the vinylic double bond by a single bond, B" is a 1,2-ethylene radical derivable from a copolymerizable vinyl monomer by replacing the vinylic double bond by a single bond, p and q are each independently of another an integer from 0 to 250, wherein the total of (p+q) is an integer from 2 to 250, T is a monovalent group that is suitable to act as a polymerization chain-reaction terminator, and Q and m are as defined above.

T may be derived from any radical being present in the underlying polymerization reaction and is, for example, hydrogen.

The total of (p+q) is preferably an integer from 2 to 150, more preferably from 5 to 100, even more preferably from 5 to 75 and particularly preferably from 10 to 50. In one preferred embodiment of the invention, q is 0 and p is an integer from 2 to 249, preferably from 3 to 149, more preferably from 4 to 99 and particularly preferably from 9 to 49. In another preferred embodiment of the invention, p and q are each independently an integer of $\geq 1$ and the sum of (p+q) is an integer from 2 to 249, preferably from 3 to 149, more preferably from 4 to 99 and especially from 9 to 49.

m is preferably a number from 1 to 3, and especially from 1 to 2.

Suitable hydrophilic substituents of the radicals B or B' may be non-ionic, anionic, cationic or zwitterionic substituents. Accordingly, the telomer chain of formula (3a) may be a charged chain containing anionic, cationic and/or zwitterionic groups or may be an uncharged chain. In addition, the telomer chain may comprise a copolymeric mixture of uncharged and charged units. The distribution of the charges within the telomer, if present, may be random or blockwise.

In one preferred embodiment of the invention, the telomer radical of formula (3a) is composed solely of non-ionic monomer units B and/or B'. In another preferred embodiment of the invention, the telomer radical of formula (3a) is composed solely of ionic monomer units B and/or B', for example solely of cationic monomer units or solely of anionic monomer units. Still another preferred embodiment of the invention is directed to telomer radicals of formula (3a) comprising nonionic units B and ionic units B'.

Suitable non-ionic substituents of B or B' include for example a radical $C_1$–$C_6$-alkyl which is substituted by hydroxy or $C_1$–$C_4$-alkoxy; phenyl which is substituted by hydroxy or $C_1$–$C_4$-alkoxy; a radical —COOY, wherein Y is $C_1$–$C_{24}$-alkyl which is unsubstituted or substituted, for example, by hydroxy, $C_1$–$C_4$-alkoxy, —O—Si(CH$_3$)$_3$, a radical —O—(CH$_2$CH$_2$O)$_{1-24}$—E wherein E is hydrogen or $C_1$–$C_6$-alkyl, or a radical —NH—C(O)—O—G, wherein —O—G is the radical of a saccharide with 1 to 8 sugar units or is a radical —O—(CH$_2$CH$_2$O)$_{1-24}$—E, wherein E is as defined above; —CONY$_1$Y$_2$ wherein Y$_1$ and Y$_2$ are each independently hydrogen, $C_1$–$C_{12}$-alkyl, which is unsubstituted or substituted for example by hydroxy, $C_1$–$C_4$-alkoxy or a radical —O—(CH$_2$CH$_2$O)$_{1-24}$—E wherein E is as defined above, or Y$_1$ and Y$_2$ together with the adjacent N-atom form a five- or six-membered heterocyclic ring having no additional heteroatom or one additional oxygen or nitrogen atom; a radical —OY$_3$, wherein Y$_3$ is hydrogen, $C_1$–$C_2$-alkyl or a radical —C(O)—$C_1$–$C_4$-alkyl; or a five- to seven-membered heterocyclic radical having at least one N-atom and being bound in each case via said nitrogen atom.

Suitable anionic substituents of B or B' include for example $C_1$–$C_6$-alkyl which is substituted by —SO$_3$H, —OSO$_3$H, —OPO$_3$H$_2$ or —COOH; phenyl which is substituted by one or more same or different substituents selected from the group consisting of —SO$_3$H, —COOH, —OH and —CH$_2$—SO$_3$H; —COOH; a radical —COOY$_4$, wherein Y$_4$ is $C_1$–$C_{24}$-alkyl which is substituted for example by —COOH, —SO$_3$H, —OSO$_3$H, —OPO$_3$H$_2$ or by a radical —NH—C(O)—O—G' wherein G' is the radical of an anionic carbohydrate; a radical —CONY$_5$Y$_6$ wherein Y$_5$ is $C_1$–$C_{24}$-alkyl which is substituted by —COOH, —SO$_3$H, —OSO$_3$H, or —OPO$_3$H$_2$ and Y$_6$ independently has the meaning of Y$_5$ or is hydrogen or $C_1$–$C_{12}$-alkyl; or —SO$_3$H; or a salt thereof, for example a sodium, potassium, ammonium or the like salt thereof.

Suitable cationic substituents of B or B' include —NR$_{23}$R$_{23}$' or $C_1$–$C_{12}$-alkyl which is substituted by a radical —NR$_{23}$R$_{23}$' or —NR$_{23}$R$_{23}$'R$_{23}$''$^+$An$^-$, wherein R$_{23}$, R$_{23}$' and R$_{23}$'' are each independently of another hydrogen or unsubstituted or hydroxy-substituted $C_1$–$C_6$-alkyl or phenyl, and An$^-$ is an anion; or a radical —C(O)NHY$_7$ or —C(O)OY$_7$, wherein Y$_7$ is $C_1$–$C_{24}$-alkyl which is substituted by —NR$_{23}$R$_{23}$' or —NR$_{23}$R$_{23}$'R$_{23}$''$^+$An$^-$ and is further unsubstituted or substituted, for example, by hydroxy, wherein R$_{23}$ R$_{23}$', R$_{23}$'' and An$^-$ are as defined above.

Suitable zwitterionic substituents of B or B' include a radical —R$_{24}$—Zw, wherein R$_{24}$ is a direct bond or a functional group, for example a carbonyl, carbonate, amide, ester, dicarboanhydride, dicarboimide, urea or urethane group; and Zw is an aliphatic moiety comprising one anionic and one cationic group each.

The following preferences apply to the hydrophilic substituents of B and B':

(i) Non-ionic Substituents:

Preferred alkyl substituents of B or B' are $C_1$–$C_4$-alkyl, in particular $C_1$–$C_2$-alkyl, which is substituted by hydroxy.

In case that the hydrophilic substituent of B or B' is a radical —COOY, Y as optionally substituted alkyl is preferably $C_1$–$C_{12}$-alkyl, more preferably $C_1$–$C_6$-alkyl, even more preferably $C_1$–$C_4$-alkyl and particularly preferably $C_1$–$C_2$-alkyl, each of which being unsubstituted or substituted by hydroxy. Examples of suitable saccharide substituents —O—G of the alkyl radical Y that is substituted by —NH—C(O)—O—G are the radical of a mono- or disaccharide, for example glucose, acetyl glucose, methyl glucose, glucosamine, N-acetyl glucosamine, glucono lactone, mannose, galactose, galactosamine, N-acetyl galactosamine, fructose, maltose, lactose, fucose, saccharose or trehalose, the radical of an anhydrosaccharide such as levoglucosan, the radical of a glucosid such as octylglucosid, the radical of a sugar alcohol such as sorbitol, the radical of a sugar acid derivative such as lactobionic acid amide, or the radical of an oligosaccharide with a maximum of 8 sugar units, for example fragments of a cyclodextrin, starch, chitosan, maltotriose or maltohexaose. The radical —O—G preferably denotes the radical of a mono- or disaccharide or the radical of a cyclodextrin fragment with a maximum of 8 sugar units. Particular preferred saccharide radicals —O—G are the radical of trehalose or the radical of a cyclodextrin fragment. In case that the alkyl radical Y is substituted by a radical —O—(CH$_2$CH$_2$O)$_{1-24}$—E or —NH—C(O)—O—G wherein —O—G is —O—(CH$_2$CH$_2$O)$_{1-24}$—E, the number of (CH$_2$CH$_2$O) units is preferably from 1 to 12 in each case and more preferably from 2 to 8. E is preferably hydrogen or $C_1$–$C_2$-alkyl.

Preferred nonionic radicals —COOY are those wherein Y is $C_1$–$C_4$-alkyl; or $C_2$–$C_6$-alkyl which is substituted by one or two substituents selected from the group consisting of hydroxy, $C_1$–$C_2$-alkoxy and —O—Si(CH$_3$)$_3$; or Y is a radical —CH$_2$CH$_2$—O—(CH$_2$CH$_2$O)$_{1-12}$—E wherein E is hydrogen or $C_1$–$C_2$-alkyl; or is a radical —C$_2$–C$_4$-alkylene-NH—C(O)—O—G, wherein —O—G is the radical of a saccharide.

More preferred non-ionic radicals —COOY are those wherein Y is $C_1$–$C_2$-alkyl, hydroxy-substituted $C_2$–$C_4$-alkyl, or a radical —CH$_2$CH$_2$—O—(CH$_2$CH$_2$O)$_{1-12}$—E, wherein E is hydrogen or $C_1$–$C_2$-alkyl; or is a radical —C$_2$–C$_4$-alkylene-NH—C(O)—O—G wherein —O—G is the radical of a saccharide.

Particularly preferred radicals —COOY comprise those wherein Y is $C_1$–$C_2$-alkyl, particularly methyl; or $C_2$–$C_3$-alkyl, which is unsubstituted or substituted by hydroxy, or is a radical —C$_2$–C$_3$-alkylene-NH—C(O)—O—G wherein —O—G is the radical of trehalose or the radical of a cyclodextrin fragment with a maximum of 8 sugar units.

Preferred non-ionic substituents —C(O)—NY$_1$Y$_2$ of B or B' are those wherein Y$_1$ and Y$_2$ are each independently of the other hydrogen or $C_1$–$C_4$-alkyl which is unsubstituted or substituted by hydroxy; or Y$_1$ and Y$_2$ together with the adjacent N-atom form a heterocyclic 6-membered ring having no further heteroatom or having one further N- or O-atom. Even more preferred meanings of $Y_1$ and $Y_2$, independently of each other, are hydrogen, $C_1$–$C_2$-alkyl or $C_2$–$C_4$-alkyl which is substituted by hydroxy; or $Y_1$ and $Y_2$ together with the adjacent N-atom form a N—$C_1$–$C_2$-alkylpiperazino or morpholino ring. Particularly preferred non-ionic radicals —C(O)—$NY_1Y_2$ are those wherein $Y_1$ and $Y_2$ are each independently of the other hydrogen, $C_1$–$C_2$-alkyl or hydroxy-$C_2$–$C_3$-alkyl; or $Y_1$ and $Y_2$ together with the adjacent N-atom form a morpholino ring.

Preferred non-ionic substituents —$OY_3$ of B or B' are those wherein $Y_3$ is hydrogen, $C_1$–$C_2$-alkyl or a group —C(O)$C_1$–$C_2$-alkyl. $Y_3$ is particularly preferred hydrogen or acetyl.

Preferred non-ionic heterocyclic substituents of B or B' are a 5- or 6-membered heteroaromatic or heteroaliphatic radical having one N-atom and in addition no further heteroatom or an additional N- or O-heteroatom, or is a 5 to 7-membered lactame. Examples of such heterocyclic radicals are N-pyrrolidonyl, 2- or 4-pyridinyl, 2-methyl pyridin-5-yl, 2-, 3-oder 4-hydroxypyridinyl, N-ε-caprolactamyl, N-imidazolyl, 2-methylimidazol-1-yl, N-morpholinyl or 4-N-methylpiperazin-1-yl, particularly N-morpholinyl or N-pyrrolidonyl.

A group of preferred non-ionic substituents of B or B' comprises $C_1$–$C_2$-alkyl, which is unsubstituted or substituted by —OH; a radical —COOY wherein Y is $C_1$–$C_4$-alkyl, hydroxy-substituted $C_2$–$C_4$-alkyl, or a radical —$C_2$–$C_4$-alkylene-NH—C(O)—O—G, wherein —O—G is the radical of a saccharide; a radical —C(O)—$NY_1Y_2$, wherein $Y_1$ and $Y_2$ are each independently of the other hydrogen or $C_1$–$C_4$-alkyl which is unsubstituted or substituted by hydroxy, or $Y_1$ and $Y_2$ together with the adjacent N-atom form a heterocyclic 6-membered ring having no further heteroatom or having one further N- or O-atom; a radical —$OY_3$, wherein $Y_3$ is hydrogen, $C_1$–$C_4$-alkyl or a group —C(O)$C_1$–$C_2$-alkyl; or a 5- or 6-membered heteroaromatic or heteroaliphatic radical having one N-atom and in addition no further heteroatom or an additional N-, O- or S-heteroatom, or a 5 to 7-membered lactame.

A group of more preferred non-ionic substituents of B or B' comprises a radical —COOY, wherein Y is $C_1$–$C_2$-alkyl, hydroxy-$C_2$–$C_3$-alkyl, or a radical —$C_2$–$C_4$-alkylene-NH—C(O)—O—G, wherein —O—G is the radical of trehalose; a radical —CO—$NY_1Y_2$, wherein $Y_1$ and $Y_2$ are each independently of the other hydrogen, $C_1$–$C_2$-alkyl or hydroxy-$C_2$–$C_3$-alkyl, or $Y_1$ and $Y_2$ together with the adjacent N-atom form a N—$C_1$–$C_2$-alkylpiperazino or morpholino ring; or a heterocyclic radical selected from the group consisting of N-pyrrolidonyl, 2- or 4-pyridinyl, 2-methylpyridin-5-yl, 2-, 3-oder 4-hydroxypyridinyl, N-ε-caprolactamyl, N-imidazolyl, 2-methylimidazol-1-yl, N-morpholinyl and 4-N-methylpiperazin-1-yl.

A particularly preferred group of non-ionic substituents of B or B' comprises the radicals

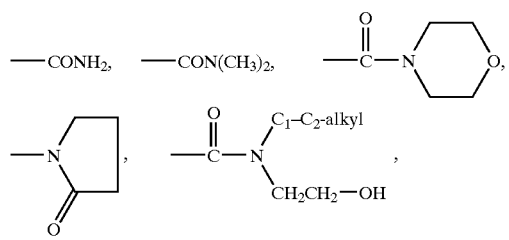

—CONH—$(CH_2)_2$—OH, and —COO$(CH_2)_2$O—NHC(O)—O—G wherein —O—G is the radical of trehalose.

Especially preferred non-ionic substituents of B or B' are —$CONH_2$, —$CON(CH_3)_2$ and N-pyrrolidonyl.

(ii) Anionic Substituents:

Preferred anionic substituents of B or B' are $C_1$–$C_4$-alkyl, in particular $C_1$–$C_2$-alkyl, which is substituted by one or more substituents selected from the group consisting of —$SO_3H$ and —$OPO_3H_2$, for example —$CH_2$—$SO_3H$; phenyl which is substituted by —$SO_3H$ or sulfomethyl, for example o-, m- or p-sulfophenyl or o-, m- or p-sulfomethylphenyl; —COOH; a radical —$COOY_4$, wherein $Y_4$ is $C_2$–$C_6$-alkyl which is substituted by —COOH, —$SO_3H$, —$OSO_3H$, —$OPO_3H_2$, or by a radical —NH—C(O)—O—G' wherein G' is the radical of lactobionic acid, hyaluronic acid or sialic acid, in particular $C_2$–$C_4$-alkyl which is substituted by —$SO_3H$ or —$OSO_3H$; a radical —$CONY_5Y_6$ wherein $Y_5$ is $C_1$–$C_6$-alkyl substituted by sulfo, in particular $C_2$–$C_4$-alkyl substituted by sulfo, and $Y_6$ is hydrogen, for example the radical —C(O)—NH—C$(CH_3)_2$—$CH_2$—$SO_3H$; or —$SO_3H$; or a suitable salt thereof. Particular preferred anionic substituents of B or B' are —COOH, —$SO_3H$, o-, m- or p-sulfophenyl, o-, m- or p-sulfomethylphenyl or a radical —$CONY_5Y_6$ wherein $Y_5$ is $C_2$–$C_4$-alkyl substituted by sulfo and $Y_6$ is hydrogen, especially —COOH.

(iii) Cationic Substituents:

Preferred cationic substituents of B or B' are —$NR_{23}R_{23}'$; $C_1$–$C_4$-alkyl, in particular $C_1$–$C_2$-alkyl which is in each case substituted by —$NR_{23}R_{23}'$ or —$NR_{23}R_{23}'R_{23}''^+An^-$; or a radical —C(O)$NHY_7$ or —C(O)$OY_7$ wherein $Y_7$ is $C_2$–$C_6$-alkyl, in particular $C_2$–$C_4$-alkyl, which is in each case substituted by —$NR_{23}R_{23}'$ or —$NR_{23}R_{23}'R_{23}''^+An^-$ and is further unsubstituted or substituted by hydroxy; wherein $R_{23}$, $R_{23}'$ and $R_{23}''$ are each independently of another preferably hydrogen, $C_1$–$C_4$-alkyl or hydroxy-substituted $C_1$–$C_4$-alkyl and more preferably hydrogen, methyl, ethyl or mono- or dihydroxy $C_2$–$C_3$-alkyl. Examples of suitable anions $An^-$ are $Hal^-$, wherein Hal is halogen, for example $Br^-$, $F^-$, $J^-$ or particularly $Cl^-$, furthermore $HCO_3^-$, $CO_3^{2-}$, $H_2PO_3^-$, $HPO_3^{2-}$, $PO_3^{3-}$, $HSO_4^-$, $SO_4^{2-}$ or the radical of an organic acid such as $OCOCH_3^-$. Particularly preferred cationic substituents of B or B' are —$NH_2$, —$CH_2$—$NH_2$, —$CH_2$—$N(CH_3)_2$, —$CH_2N(CH_3)_2$, —$CH_2$—NH—$CH_2$—CH(OH)—$CH_2$—OH, —C(O)NH—$(CH_2)_{2-3}$—$NH_2$, —C(O)O—$(CH_2)_{2-3}$—$NH_2$, —COO—$(CH_2)_2$—$N(CH_3)_2$ or —C(O)O—$CH_2$—CH(OH)—$CH_2$—$N(CH_3)_3^+An^-$, wherein $An^-$ is an anion. Especially preferred cationic substituents of B or B' are —$NH_2$, —C(O)NH—$(CH_2)_{2-3}$—$NH_2$, —C(O)O—$(CH_2)_{2-3}$—$NH_2$ or —$CH_2$—NH—$CH_2$—CH(OH)—$CH_2$—OH.

(iv) Zwitterionic Substituents —$R_{24}$—Zw:

$R_{24}$ is a preferably a carbonyl, ester or amide functional group and more preferably an ester group —C(O)—O—.

Suitable anionic groups of the moiety Zw are for example —$COO^-$, —$SO_3^-$, —$OSO_3^-$, —$OPO_3H^-$ or bivalent —O—$PO_2^-$ or —O—$PO_2^-$—O—, preferably a group —$COO^-$ or —$SO_3^-$ or a bivalent group —O—$PO_2^-$—, and in particular a group —$SO_3^-$.

Suitable cationic groups of the moiety Zw are for example a group —$NR_{23}R_{23}'R_{23}''^+$ or a bivalent group —$NR_{23}R_{23}'^+$—, wherein $R_{23}$, $R_{23}'$ and $R_{23}''$ are as defined above, and are each independently of the other, preferably hydrogen or $C_1$–$C_6$-alkyl, preferably hydrogen or $C_1$–$C_4$-alkyl and most preferably each methyl or ethyl.

The moiety Zw is for example $C_2$–$C_{30}$-alkyl, preferably $C_2$–$C_{12}$-alkyl, and more preferably $C_3$–$C_8$-alkyl, which is in each case uninterrupted or interrupted by —O— and substituted or interrupted by one of the above-mentioned anionic and cationic groups each, and, in addition, is further unsubstituted or substituted by a radical —$OY_8$, wherein $Y_8$ is hydrogen or the acyl radical of a carboxylic acid.

$Y_8$ is preferably hydrogen or the acyl radical of a higher fatty acid.

Zw is preferably $C_2$–$C_{12}$-alkyl and even more preferably $C_3$–$C_8$-alkyl which is substituted or interrupted by one of the above-mentioned anionic and cationic groups each, and in addition may be further substituted by a radical —$OY_8$.

A preferred group of zwitter-ionic substituents —$R_{24}$— Zw corresponds to the formula

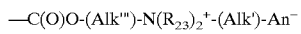

or

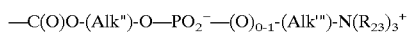

wherein $R_{23}$ is hydrogen or $C_1$–$C_6$-alkyl; $An^-$ is an anionic group —$COO$—, —$SO_3^-$, —$OSO_3^-$ or —$OPO_3H^-$, preferably —$COO^-$ or —$SO_3^-$ and most preferably —$SO_3^-$, (Alk') is $C_1$–$C_{12}$-alkylene, (Alk'') is $C_2$–$C_{24}$-alkylene which is unsubstituted or substituted by a radical —$OY_8$, $Y_8$ is hydrogen or the acyl radical of a carboxylic acid, and (Alk''') is $C_2$–$C_8$-alkylene.

(Alk') is preferably $C_2$–$C_8$-alkylene, more preferably $C_2$–$C_6$-alkylene and most preferably $C_2$–$C_4$-alkylene. (Alk'') is preferably $C_2$–$C_{12}$-alkylene, more preferably $C_2$–$C_6$-alkylene and particularly preferably $C_2$–$C_3$-alkylene which is in each case unsubstituted or substituted by hydroxy or by a radical —$OY_8$. (Alk''') is preferably $C_2$–$C_4$-alkylene and more preferably $C_2$–$C_3$-alkylene. $R_{23}$ is hydrogen or $C_1$–$C_4$-alkyl, more preferably methyl or ethyl and particularly preferably methyl. A preferred zwitterionic substituent of B or B' is of formula

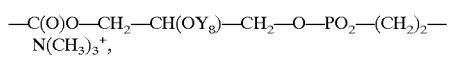

wherein $Y_8$ is hydrogen or the acyl radical of a higher fatty acid.

B denotes for example a radical of formula

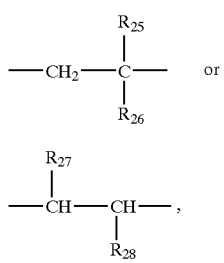

preferably a radical of formula (4a), wherein $R_{25}$ is hydrogen or $C_1$–$C_4$-alkyl, preferably hydrogen or methyl; $R_{26}$ is a hydrophilic substituent, wherein the above given meanings and preferences apply; $R_{27}$ is $C_1$–$C_4$-alkyl, phenyl or a radical —$C(O)OY_9$, wherein $Y_9$ is hydrogen or unsubstituted or hydroxy-substituted $C_1$–$C_4$-alkyl; and $R_{28}$ is a radical —$C(O)OY_9'$ or —$CH_2$—$C(O)OY_9'$ wherein $Y_9'$ independently has the meaning of $Y_9$.

$R_{27}$ is preferably $C_1$–$C_2$-alkyl, phenyl or a group —$C(O)OY_9$. $R_{28}$ is preferably a group —$C(O)OY_9'$ or —$CH_2$—$C(O)OY_9'$ wherein $Y_9$ and $Y_9'$ are each independently of the other hydrogen, $C_1$–$C_2$-alkyl or hydroxy-$C_1$–$C_2$-alkyl. Particularly preferred —$CHR_{27}$—$CHR_{28}$— units according to the invention are those wherein $R_{27}$ is methyl or a group —$C(O)OY_9$ and $R_{28}$ is a group —$C(O)OY_9'$ or —$CH_2$—$C(O)OY_9'$ wherein $Y_9$ and $Y_9'$ are each hydrogen, $C_1$–$C_2$-alkyl or hydroxy-$C_1$–$C_2$-alkyl.

B' independently may have one of the meanings given above for B.

A suitable substituent Q of the radical (oligomer$^1$), (oligomer) or B'' is, for example, of formula

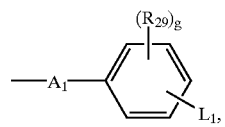

wherein $R_{29}$ is $C_1$–$C_4$-alkyl, $C_1$–$C_4$-alkoxy, amino, hydroxy, sulfo, nitro, trifluoromethyl or halogen, g is an integer from 0 to 2, $L_1$ is a group, which functions as a triggerable precursor for carbene or nitrene formation, and $A_1$ is a linking member, for example, of formula

 (6a),

 (6b),

 (6c),

 (6d),

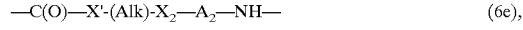 (6e), or

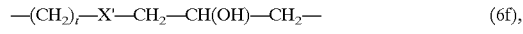 (6f), wherein X' and $X_2$ are each independently a group —O— or —$NR_1'$—, $R_1'$ is hydrogen or $C_1$–$C_4$-alkyl; $D_1$ is a group —$C(O)$— or —$C(S)$—, (Alk) is $C_2$–$C_{12}$-alkylene, and t is 0 or 1.

$L_1$ in formula (5) is, for example, a group of formula

 (7a)

or —$N_3$ (7b), wherein $R_{30}$ is an electron-withdrawing substituent, for example fluorinated $C_1$–$C_6$-alkyl, such as a radical —$C_2F_5$ or preferably a radical —$CF_3$.

$R_{29}$ is preferably $C_1$–$C_4$-alkoxy, nitro, $C_1$–$C_4$-alkyl, hydroxy, amino or sulfo. The variable g is, for example, 1 or preferably 0.

Formulae (6a)–(6e) are to be understood, that the left bond is in each case directed to (oligomer$^1$), (oligomer) or B'', and the right bond is directed to the aromatic ring.

(Alk) in formulae (6c) or (6e) is preferably $C_2$–$C_6$-alkylene and in particular $C_2$–$C_3$-alkylene.

X' and $X_2$ are each independently of the other preferably —O— or —NH—, in particular —NH—.

t is the number 1 or preferably 0.

$A_1$ is preferably a group of formula (6b), (6c), (6d) or (6e), in particular a group of formula (6b) or (6c), where each the above given meanings and preferences apply for the variables contained in these formulae.

A preferred embodiment relates to a radical Q of the formula (5), above, wherein $A_1$ is a radical of formula (6b) or (6c), g is 0 and $L_1$ is a radical of formula (7a). A further preferred embodiment relates to a radical Q of the formula (5), above, wherein $A_1$ is a radical of formula (6b) or (6c), g is 0 and $L_1$ is a radical of formula (7b).

B''—Q in formula (3a) is preferably a 1,2-ethylene radical of formula

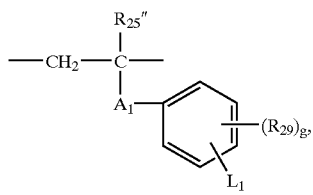

(4c)

wherein $R_{25}''$ independently has the meaning of $R_{25}$ given above, and for $A_1$, $L_1$, $R_{29}$ and g each the above given meanings and preferences apply.

A preferred embodiment according to the invention concerns a telomer radical (i)-(oligomer)-(Q)$_m$ of formula

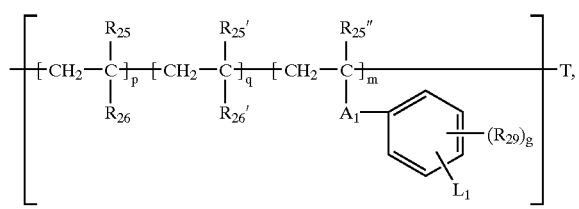

(3b)

wherein $R_{25}'$ and $R_{25}''$ each independently have the meaning of $R_{25}$ given before, $R_{26}'$ independently has the meaning of $R_{26}$ given before, and for $R_{25}$, $R_{26}$, $R_{29}$, $A_1$, $L_1$, T, g, p, q and m each the above given meanings and preferences apply.

A particularly preferred telomer radical -(oligomer)-(Q)$_m$ is of formula (3b) above, wherein $R_{25}$, $R_{25}'$ and $R_{25}''$ are each independently hydrogen or methyl, $R_{26}$ is a radical —CONH$_2$, —CON(CH$_3$)$_2$ or N-pyrrolidonyl, $R_{26}'$ is —NH$_2$ or —C(O)X'-(Alk)-NH$_2$, X' is —O— or —NH—, (Alk) is $C_2$–$C_3$-alkylene, $A_1$ is a radical —NH—C(O)— or —C(O)—NH—(CH$_2$)$_{2-4}$—NH—C(O)—, g is 0, and $L_1$ is a radical

or —N$_3$.

The telomer radicals of formula (3), (3a) or (3b) have an number average molecular weight $M_n$ of, for example, from 200 to 20000, preferably from 250 to 12500, more preferably from 350 to 5000, and in particular from 500 to 3000.

A preferred group of polymers according to the invention are those comprising units of formula (1a) above, wherein R is hydrogen or methyl; $Z_1$ is a radical of formula (2) above; A is a radical of formula

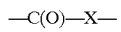

—C(O)—X— (2a),

—C(O)—O-(alk'')-NH—C(O)—X— (2d), (alk'') is $C_2$–$C_4$-alkylene, in particular 1,2-ethylene; X is —NH—; and (oligomer$^1$)-(Q)$_m$ is a telomer radical of formula (3) above, wherein (alk) is $C_2$–$C_4$-alkylene, in particular 1,2-ethylene, and (oligomer)-(Q)$_m$ is a radical of formula (3b) above.

(oligomer$^1$)-(Q)$_m$ as an oligosaccharide (ii) is, for example, a di- or polysaccharide including carbohydrate containing fragments from a biopolymer, to which are attached m radicals Q as defined above. Examples are the radical of a cyclodextrin, trehalose, cellobiose, maltotriose, maltohexaose, chitohexaose or a starch, lactobionic acid, hyaluronic acid, deacetylated hyaluronic acid, chitosan, agarose, chitin 50, amylose, glucan, heparin, xylan, pectin, galactan, glycosaminoglycan, mucin, dextran, aminated dextran, cellulose, hydroxyalkylcellulose or carboxyalkylcellulose oligomer, each of which comprising m radicals Q wherein the above given meanings and preferences apply, and each of which with a number average molecular weight of, for example, up to 25000, preferably up to 10000.

A further preferred group of polymers according to the invention are those comprising units of formula (1a) above, wherein R is hydrogen; $Z_1$ is a radical of formula (2) above; A is a radical of formula (2h), (2i) or (2k) above and (oligomer$^1$)-(Q)$_m$ is the radical of lactobionic acid, wherein the carboxy group is part of A and at least one hydroxy group is substituted by a radical Q.

(oligomer$^1$)-(Q)$_m$ as an oligopeptide (iii) is, for example a radical of formula —(CHR$_{21}$—C(O)—NH)$_l$—CHR$_{21}$—COOH (8a)

or

—CHR$_{21}$—(NH—C(O)—CHR$_{21}$)$_l$—NH$_2$ (8b), wherein $R_{21}$ is hydrogen, $C_1$–$C_4$-alkyl or $C_1$–$C_4$-alkyl which is substituted by hydroxy, carboxy, carbamoyl, amino, phenyl, o-, m- or p-hydroxyphenyl, imidazolyl, indolyl or a radical —NH—C(=NH)—NH$_2$, l is an integer from 2 to 250 and m of the radicals $R_{21}$ or the terminating amino or carboxy group are substituted by a radical Q. Preferably the polypeptide according to (iii) is a radical of formula (8a) or 8b), wherein $R_{21}$ is hydrogen, methyl, hydroxymethyl, carboxymethyl, 1-hydroxyethyl, 2-carboxyethyl, isopropyl, n-, sec. or iso-butyl, 4-amino-n-butyl, benzyl, p-hydroxybenzyl, imidazolylmethyl, indolylmethyl or a radical —(CH$_2$)$_3$—NH—C(=NH)—NH$_2$. l is an integer from 2 to 150, preferably from 5 to 100, more preferably from 5 to 75 and particularly preferably from 10 to 50, and 1 to 4 radicals $R_{21}$ or the terminating amino or carboxy group is substituted by a radical Q, wherein the above given meanings and preferences apply.

(oligomer$^1$)-(Q)$_m$ as a polyoxyalkylene radical (iv) is, for example a radical of formula —(alk—O)$_t$—[CH$_2$—CH$_2$—O]$_d$—[CH$_2$—CH(CH$_3$)—O]$_e$—R$_{22}$ (8c), wherein (alk) is $C_2$–$C_4$-alkylene, t is 0 or 1, d and e are each independently an integer from 0 to 250 and the total of (d+e) is from 2 to 250, and $R_{22}$ is a radical of formula

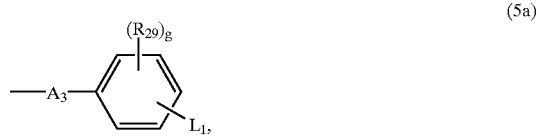

(5a)

wherein $L_1$, $R_{29}$ and g are as defined above, $A_3$ is, for example, a radical —C(O)—, —C(O)—NH— or —C(S)—NH—, and the nitrogen of the latter two radicals is each attached to the phenyl ring.

(alk**) is preferably a $C_2$–$C_3$-alkylene radical. t is preferably 0. d and e are each independently preferably an integer from 0 to 100 wherein the total of (d+e) is 5 to 100. d and e are each independently more preferably an integer from 0 to 50 wherein the total of (d+e) is 8 to 50. In a particularly preferred embodiment of the polyoxyalkylene radicals (iv) d is an integer from 8 to 50 and particularly 9 to 25, and e is 0.

In addition to the units of formula (1a) or (1b), the polyvinyl polymers (I) of the present invention may contain further units which are derived from ethylenically unsaturated compounds.

Examples of further units which may be part of the polyvinyl polymers of the invention are:

(a) units —[$B_1$]—, wherein $B_1$ independently has the meaning of B mentioned above. A preferred unit —[$B_1$]— is of formula

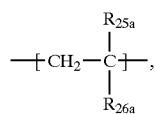
(4a')

wherein $R_{25a}$ and $R_{26a}$ each independently have the meanings of $R_{25}$ and $R_{26}$ including the preferences given above. Examples of suitable —[$B_1$]— units are the radicals derived from acrylamide, N,N-dimethyl acrylamide, N-hydroxyethyl acrylamide, N-vinylpyrrolidone, 2-hydroxyethyl acrylate or methacrylate, N-acryloyl morpholine, methyl methacrylate, vinyl acetate, vinyl alcohol or allyl amine or the like by replacing the double bond by a single bond;

(b) units of formula

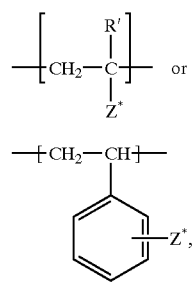
(9a)

(9b)

wherein R' independently has the meaning of R and $Z^*$ is is a hydrophilic side chain which is devoid of a triggerable precursor for carbene or nitrene formation and has a weight average molecular weight of $\geq 200$.

$Z^*$ is, for example, the radical of a hydrophilic telomer, oligopeptide, oligosaccharide or polyalkylene oxide, preferably the radical of a hydrophilic telomer or of an oligosaccharide.

A preferred side chain $Z^*$ is a radical

—A'—(alk*)—S—(oligomer') (3c), wherein A' independently has the meaning of A, (alk*) independently has the meaning of (alk), and (oligomer') is the radical of a hydrophilic telomer which is derived from one or more different copolymerizable vinyl monomers and which is devoid of a radical comprising a triggerable precursor for carbene or nitrene formation.

A further preferred side chain $Z^*$ is a radical

—A'—(oligomer'') (3c'), wherein A' is a radical of formula (2h), (2i) or (2k) and (oligomer'') is the radical of an oligosaccharide, in particular the radical of lactobionic acid.

The telomer radical -(oligomer') corresponds, for example, to formula

—([$B_2$]$_{p1}$—[$B_2'$]$_{q1}$)—T' (3d), wherein $B_2$ independently has the meaning of B mentioned before, $B_2'$ independently has the meaning of B' mentioned before, T' independently has the meaning of T mentioned before, p1 and q1 are each independently an integer from 0 to 250 and the total of (p1+q1) is an integer from 2 to 250.

A preferred embodiment according to the invention concerns a telomer radical -(oligomer') of formula

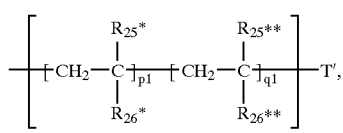
(3d')

wherein $R_{25}^*$ and $R_{25}^{**}$ each independently have the meaning of $R_{25}$ given before, $R_{26}^*$ and $R_{26}^{**}$ each independently have the meaning of $R_{26}$ given before, p1 and q1 are each independently an integer of from 0 to 150 and the total of (p1+q1) is an integer from 2 to 150, and T' independently has the meaning of T.

A preferred comb-type polymer according to the invention is a polymer comprising units of formula

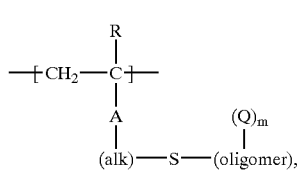
(1a')

and optionally units of formula

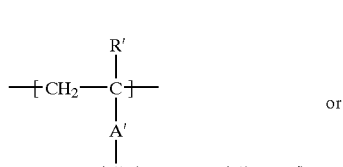
(9a')

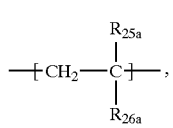
(4a')

wherein A, A', R, R', $R_{25a}$, $R_{26a}$, (alk), (alk*), (oligomer)-$(Q)_m$ and (oligomer') are as defined above.

Another preferred comb-type polymer according to the invention is a polymer comprising units of formula

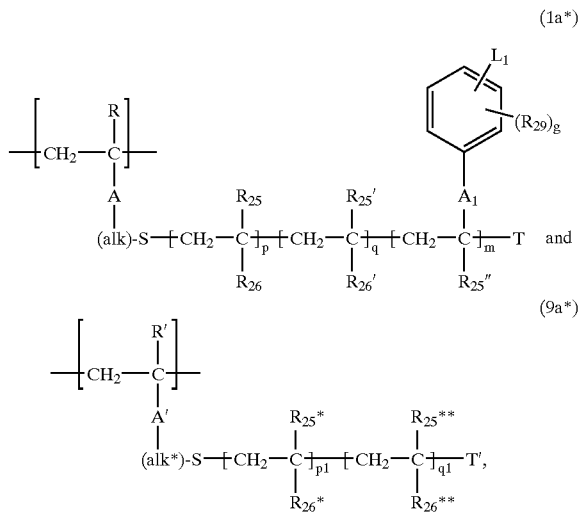

wherein the variables are each as defined above.

A particular preferred polymer consists of units of the above formula (1a*) and optionally (9a*) above, wherein R and R' are identical and are each hydrogen or methyl;

$R_{25}$ and $R_{25}^*$ are identical and are each hydrogen or methyl;

$R_{25}'$, $R_{25}''$, and $R_{25}^{**}$ are identical and are each hydrogen or methyl;

$R_{26}$ and $R_{26}^*$ are identical and are preferably each a radical —$CONH_2$, —$CON(CH_3)_2$ or N-pyrrolidonyl;

$R_{26}'$ and $R_{26}^{**}$ are identical and are each —$NH_2$ or —C(O)X'-(Alk)-$NH_2$, wherein X' is —O— or —NH— and (Alk) is $C_2$-$C_3$-alkylene;

$A_1$ is a radical —NH—C(O)— or —C(O)—NH—$(CH_2)_{2-4}$—NH—C(O)—;

g is 0 and $L_1$ is a radical

or —$N_3$;

A and A' are identical and are each a radical of formula

—C(O)—X— (2a),

—C(O)—O—(alk")—NH—C(O)—X— (2d), wherein (alk") is $C_2$-$C_4$-alkylene and X is —NH—;

(alk) and (alk*) are identical and are each $C_2$-$C_4$-alkylene, in particular 1,2-ethylene;

T and T' are each independently a radical of a polymerization-reaction chain terminator p and p1 are identical and are each an integer of from 0 to 250;

$q_1$ is identical to the total of (q+m) and both are an integer of from 2 to 250;

m is an integer of from 1 to 2; and q is an integer of from ($q_1$-1) to ($q_1$-2).

A further particular preferred comb-type polymer consists of units of the above formula (1a*) only, wherein the above given meanings and preferences apply for the variables contained therein.

Formulae such as formulae (1a*), (3a), (3b), (3d), (3d'), (8c) and (9a*) are to be understood as a statistic description of the respective compounds and radicals, that is to say the orientation and sequence of the units are not fixed in any way by said formulae. In addition, the values of d, e, p, p1, q, q1 and m in said formulae are statistically ones indicating the statistical composition of the monomers or segments.

Throughout the application terms such as carboxy, carboxylic acid, —COOH, sulfo, —$SO_3H$, amino, —$NH_2$ and the like always include the free acid or amine as well as a suitable salt thereof, for example a biomedically or in particular occularly acceptable salt thereof such as, for example, a sodium, potassium, ammonium salt or the like (of an acid), or a hydrohalide such a hydrochloride (of an amine).

A comb-type polyethylene imine (II) according to the invention is, for example, a polymer comprising units of formula (1c) above, wherein $Z_2$ is a radical of formula

wherein for Q, m and (oligomer$^1$) each the above-given meanings and preferences apply.

A comb-type polypeptide (III) according to the invention is, for example, a polymer comprising units of formula (1d) above, wherein $Z_3$ is a radical of formula

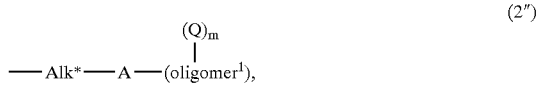

wherein Alk* is $C_1$-$C_4$-alkylene, in particular methylene or 1,4-butylene, A is, for example, a radical —C(O)X— or —XC(O)— and for X, Q, m and (oligomer$^1$) each the above-given meanings and preferences apply.

A comb-type polyether (IV) according to the invention is, for example, a polyglycidol, wherein the hydroxy groups are substituted in part by a radical of formula

wherein A is, for example, —OC(O)—, and for Q, m and (oligomer$^1$) each the above-given meanings and preferences apply.

A comb-type polysaccharide (V) according to the invention is, for example, a chitosan, hyaluronic acid, aminodextrane or carboxymethyl cellulose, wherein the hydroxy, amino or carboxy groups are substituted in part by a radical of the formula (2) given above, wherein A is, for example, —XC(O)— or —C(O)X—, and for X, Q, m and (oligomer$^1$) each the above-given meanings and preferences apply.

The comb-type polymers of the invention have a number average molecular weight $M_n$ of, for example, from 10 to 200000 kDa and preferably from 150 to 1500 kDa.

The polyvinyl polymers (i) of the invention may be prepared, for example by polymerising a macromonomer of formula

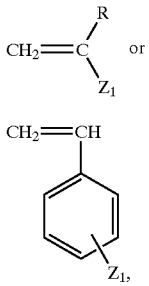

(10)

$$CH_2=\underset{Z_1}{\overset{R}{C}}$$ or $$CH_2=CH$$ (11)

wherein R and $Z_1$ are as defined, optionally in the presence of further comonomers, in a manner known per se.

The polymerization of the macromonomer(s) is carried out, for example in solution and may be initiated, for example, thermally by the action of heat or by irradiation, in particular thermally. Suitable solvents are, for example, water, $C_1$–$C_4$-alcanols such as methanol or ethanol, glycols such as ethylene glycol or dipolar aprotic solvents such as, for example, acetonitrile, N,N-dimethyl formamide (DMF), N-methyl pyrrolidone (NMP), dimethyl sulfoxide (DMSO), N,N-dimethyl acetamide or acetone.

In case of a thermally initiated polymerization of the macromonomer(s) said polymerization may be carried out, for example, at elevated temperature, for example at a temperature of from 35 to 100° C. and preferably 40 to 80° C., for a time period of, for example, from 10 minutes to 48 hours and preferably 30 minutes to 36 hours in the presence of a solvent and a thermal initiator. Suitable thermal polymerization initiators are known to the skilled artisan and comprise for example peroxides, hydroperoxides, azo-bis (alkyl- or cycloalkylnitriles), persulfates, percarbonates or mixtures thereof. Examples are benzoylperoxide, tert.-butyl peroxide, di-tert.-butyl-diperoxyphthalate, tert.-butyl hydroperoxide, azo-bis(isobutyronitrile), 1,1'-azo-bis (1-cyclohexanecarbonitrile), 2,2'-azo-bis(2,4-dimethylvaleronitrile), 4,4'-azo-bis(4-cyanovaleric acid, 4,4'-azo-bis(4-cyano-n-pentanol) and the like.

The polymerisation of the macromonomers of formula (10a) or (10b) may also be carried out according to PCT application WO 92/09639 by polymerizing them, optionally in the presence of one or more comonomers, in the presence of a chain transfer agent such as cysteamine hydrochloride, thioglycolic acid or the like.

The compounds of formula (10), for example those of formula

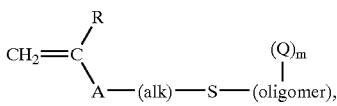

(10a)

wherein the variables are as defined above, may be obtained, for example, in analogy to the method disclosed in WO 99/57581, by reacting a compound of formula

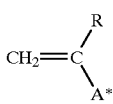

(12)

wherein R has the above-given meaning and A* is, for example, a group —C(O)—A°, wherein A° is, for example, hydroxy, halogen, particularly chlorine, the radical of an ester group; or an oxyalkylene radical comprising an epoxy group, for example the radical

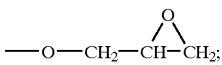

or a radical —O—$C_2$–$C_{12}$-alkylene-N=C=O; or a radical

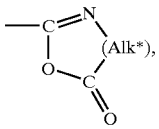

with a compound of formula

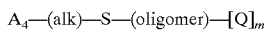

$A_4$—(alk)—S—(oligomer)—[Q]$_m$ (13), wherein (alk), (Alk*), and (oligomer)-[Q]$_m$ are as defined above, and $A_4$ is a group co-reactive to A*, for example hydroxy, amino, carboxy or a derivative thereof, in particular amino.

A carboxy derivative, a derivative of carboxy and the like are to be understood as meaning, for example, a lactone, a carboxylic acid anhydride, halide, amide or ester, for example —C(O)Cl, —C(O)NH$_2$, —C(O)C$_1$–C$_6$-alkyl, —C(O)-phenyl or in particular an activated ester such as carboxy having been reacted with an activating agent, for example with N-hydroxy succinimide (NHS) or sulfo-N-hydroxy succinimide. A particularly preferred carboxy derivative is an activated ester of formula

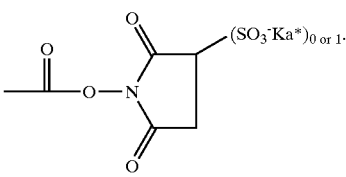

wherein Ka$^+$ is a cation, for example, Na$^+$ or K$^+$.

For example, the reactions of a compound of formula (12) having a carboxy, carboxylic acid halide, ester, in particular activated ester, acid anhydride, isocyanato or isothiocyanato group with amino or hydroxy groups $A_4$ of the compound of formula (13), or vice versa, are well-known in the art and may be carried out as described in textbooks of organic chemistry.

For example, the reaction of an isocyanato or isothiocyanato derivative of formula (12) with amino- or hydroxy groups $A_4$ of the compound of formula (13) may be carried out in an inert organic solvent such as an optionally halogenated hydrocarbon, for example petroleum ether, methylcyclohexane, toluene, chloroform, methylene chloride and the like, or an ether, for example diethyl ether, tetrahydrofurane, dioxane, or a more polar solvent such as DMSO, DMA, N-methylpyrrolidone or even a lower alcohol, at a temperature of from 0 to 100° C., preferably from 0 to 50° C. and particularly preferably at room temperature, optionally in the presence of a catalyst, for example a tertiary amine such as triethylamine or tri-n-butylamine, 1,4-diazabicyclooctane, or a tin compound such as dibutyltin dilaurate or tin dioctanoate. It is advantageous to carry out the above reactions under an inert atmosphere, for example under an nitrogen or argon atmosphere.

In case of a compound of formula (12) carrying a carboxy anhydride group, the reaction of the carboxy anhydride with amino or hydroxy groups $A_4$ of the compound of formula (13) may be carried out as described in organic textbooks, for example in an aprotic solvent, for example one of the above-mentioned aprotic solvents, at a temperature from room temperature to about 100° C.

In case of a compound of formula (12) carrying a carboxy group, the reaction of said carboxy group with amino or hydroxy groups $A_4$ of the compound of formula (13) (or vice versa) may be carried out under the conditions that are customary for ester or amide formation, for example in an aprotic medium at a temperature from about room temperature to about 100° C. It is further preferred to carry out the esterification or amidation reaction in the presence of an activating agent, for example N-ethyl-N'-(3-dimethylaminopropyl)carbodiimide (EDC), N-hydroxy succinimide (NHS), sulfo-N-hydroxy succinimide or N,N'-dicyclohexyl carbodiimide (DCC) or in the presence of an o-(benztriazole)-uronium salt such as o-(benztriazol-1-y-)-N,N,N,N-tetramethyluronium hexafluorophosphate. Most preferably, the carboxylic acid derivative of formula (12) is previously converted to an activated ester using one of the above-mentioned activating agents, and the activated ester is then further reacted with the hydroxy or preferably amino groups of the compound of formula (13).

In case that the compound of formula (12) carries an glycidyl group, the reaction of said glycidyl group with amino groups $A_4$ of the compound of formula (13) may be carried out, for example, at room temperature or at elevated temperature, for example at about 20 to 100° C., in water, in a suitable organic solvent or in mixtures thereof. The reaction of the glycidyl group with hydroxy groups $A_4$ of the compound of formula (13) may be carried out, for example, at room temperature or at elevated temperature, for example at about 20 to 100° C., in an aprotic medium using a base catalyst, for example $Al(O-C_1-C_6-alkyl)_3$ or $Ti(O-C_1-C_6-alkyl)_3$.

The compounds of formula (12) are known and commercially available in part.

The compounds of formula (13) may be prepared according to known methods, for example as described in WO 92/09639 or WO 99/57581, by copolymerising one or more hydrophilic ethylenically unsaturated monomers, at least one of them carrying a group —[Q], in the presence of a functional chain transfer agent such as cysteamine hydrochloride, thioglycolic acid or the like.

A suitable monomer carrying a group [Q] is, for example, a monomer of formula

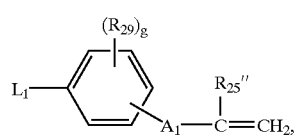

(14)

wherein $A_1$, $L_1$, $R_{25}''$, $R_{29}$ and g are each as defined above.

The compounds of formula (14) may be obtained, for example, by reacting a compound of formula $H_2C=C(R_{25}'')A^{**}$ (15)

with a compound of formula

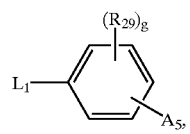

(5a)

wherein $A^{**}$ independently has the meaning of $A^*$ given before, $A_5$ independently has the meaning of $A_4$ given before and is preferably a radical hydroxy, amino, carboxy or an above given derivative thereof, —NCO, —NCS or glycidyl, and $R_{25}''$, $R_{29}$, $L_1$ and g each have the above given meaning. The reaction between the compounds of formula (5a) and (15) may be carried out as described above.

The compounds of formula (5a) are known or may be prepared according to known methods, some of them are also commercially available.

The telomer compounds of formula (13) are preferably obtained by copolymerising a compound of formula (14) above, wherein the above given meanings and preferences apply for the variables contained therein, with a hydrophilic monomer, for example a monomer of formula $CH_2=CR_{25a}R_{26a}$, wherein $R_{25a}$ and $R_{26a}$ are as defined above, in particular acrylamide, N,N-dimethyl acrylamide or N-vinyl pyrrolidone, in the presence of a functional chain transfer agent such as cysteamine hydrochloride, thioglycolic acid or the like.

The compounds of formula (10), wherein $Z_1$ comprises an oligosaccharide, oligopeptide or polyalkylene oxide radical -(oligomer$^1$)-(Q)$_m$, may be prepared, for example, by reacting a commercially available oligosaccharide, oligopeptide or polyalkylene oxide with a compound each of the above given formulae (12) and (5a) according to methods described above.

A further synthetic route to a group of comb-type polymers of the invention comprises first preparing a polymer comprising units of formula

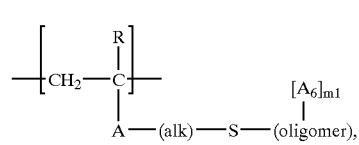

(1')

wherein A, R, (alk) and (oligomer) are as defined, $A_6$ is, for example, carboxy or a derivative thereof, or is a radical —(CH$_2$)$_t$—X'H, or is a radical —C(O)X'-(Alk)-X$_2$H, wherein X', X$_2$, (Alk) and t are as defined above, and m1 is an integer of, for example, from 1 to 250, preferably from 1 to 100 and especially from 1 to 50, and reacting said polymer with about m equivalents of a compound of formula

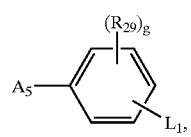

(5a)

wherein $R_{29}$, $L_1$ and g are as defined above, and $A_5$ is a group co-reactive to $A_6$, for example a radical —X'H, carboxy or a derivative thereof, —NCO, —NCS or glycidyl, wherein X' is as defined above.

The reactions between $A_6$ groups of the polymer of formula (1') and $A_5$ groups of the compound of formula (5a) may be carried out as described above.

The polymers of formula (1') may be obtained, for example, by (co)polymerising the underlying macromonomer, optionally in the presence of further comonomers or comacromers, according to one of the methods mentioned above for the polymerisation of the compounds of formula (10a). Said macromonomers may be obtained according to the method described in WO 99/57581.

A particularly preferred embodiment of the invention relates to a polymer comprising units of formula

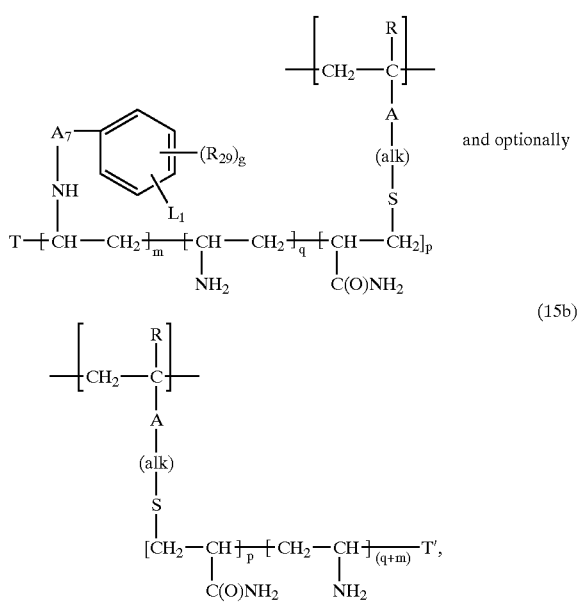

wherein A, $L_1$, R, $R_{29}$, T, T', (alk), g, p, q and m are each defined as mentioned above, and $A_7$ is —C(O)—, —NHC(O)—, —NHC(S)— or —CH$_2$—CH(OH)—CH$_2$—, in particular —C(O)—, which is obtainable by preparing first a macromonomer of formula

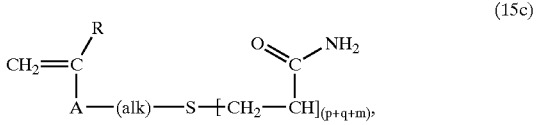

polymerizing the macromonomer in a manner known per se to yield a homopolymer comprising or preferably consisting of units of formula

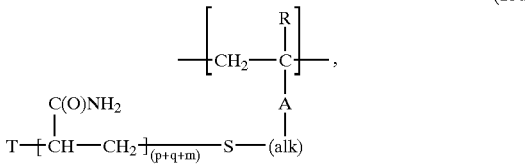

reducing the carbonamido group of (q+m) carbonamidoethylene units to amino groups, for example, by subjecting the homopolymer comprising units of formula (15c) to a Hofmann degradation reaction, to yield a polymer comprising units of formula

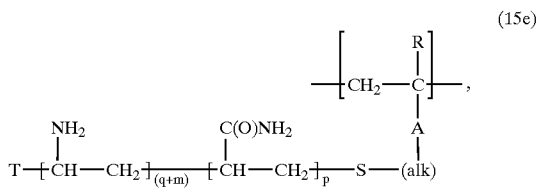

and reacting said polymer with a compound of formula (5a) given before in an amount sufficient to provide some or all of the polymer side chains with (m) triggerable precursors for carbene or nitrene formation, wherein $A_7$ is carboxy or a derivative thereof, or is —NCO, —NCS or glycidyl. In the above formulae (15a)–(15e), the variables have the meanings and preferences as indicated before.

The macromonomers of formula (15c) are known or may be prepared according to known methods, for example as described in WO 92/09639 or WO 99/57581. The polymerisation of the macromonomer of formula (15c) may be carried out using standard procedures as described above. The degradation of a certain amount of carbonamido groups to amino groups within the polymer of formula (15d) may be carried out as described in textbooks of Organic Chemistry, for example by the action of a hypochloride such as NaOCl in an aqueous alkaline medium. For example, about 0.5 to 40%, preferably 1 to 20%, of the carbonamido groups are converted to amino groups. The reaction of the resulting polymer of formula (15e) with the compound of formula (5a) may be carried out as described above.

The comb-type polymers of the invention comprising units of the above given formula (1a) or (1b) furthermore may be obtained by reacting a polyvinyl- or polystyryl polymer comprising reactive groups, for example, amino, methylamino, hydroxy or carboxy groups or a suitable derivative thereof, with an oligomer, for example an oligosaccharide, oligopeptide or polyalkylene oxide, having a functional group that is co-reactive to the reactive group of the polyvinyl or polystyryl polymer, e.g. a carboxy, amino or hydroxy group or a derivative thereof. Functional groups within the side chains of the resulting comb polymers, for example amino or hydroxy groups, then may be reacted with a compound of the above given formula (5a) to yield a reactive comb polymer of the invention.

Likewise, the comb-type polymers of the invention comprising units of formula (1c) or (1d) may be obtained, for example, by reacting a commercially available polyethylene imine, polypeptide or polysaccharide with with an oligomer, for example a telomer, oligosaccharide, oligopeptide or polyalkylene oxide, having a co-reactive functional group and then reacting functional groups within the side chains of the resulting comb polymer, for example amino or hydroxy groups, with a compound of the above given formula (5a).

Examples of materials to be coated according to the invention are inorganic or organic bulk materials, for example quartz, ceramics, glasses, silicate minerals, silica gels, metals, metal oxides, carbon materials such as graphite or glassy carbon, natural or synthetic organic polymers, or laminates, composites or blends of said materials, in particular natural or synthetic organic polymers which are known in large number. Some examples of polymers are polyaddition and polycondensation polymers (polyurethanes, epoxy resins, polyethers, polyesters, polyamides and polyimides); vinyl polymers (polyacrylates, polymethacrylates, polystyrene, polyethylene and halogenated derivatives thereof, polyvinyl acetate and polyacrylonitrile); or elastomers (silicones, polybutadiene and polyisoprene).

A preferred group of materials to be coated are those being conventionally used for the manufacture of biomedical devices, e.g. contact lenses, in particular contact lenses, which are not hydrophilic per se. Such materials are known to the skilled artisan and may comprise for example polysiloxanes, perfluoropolyethers, fluorinated poly(meth)acrylates or equivalent fluorinated polymers derived e.g. from other polymerizable carboxylic acids, polyalkyl (meth)acrylates or equivalent alkylester polymers derived from other polymerizable carboxylic acids, polyolefines, or fluorinated polyolefines, such as polyvinylidene fluoride, fluorinated ethylene propylene, or tetrafluoroethylene, preferably in combination with specific dioxols, such as perfluoro-2,2-dimethyl-1,3-dioxol. Examples of suitable bulk materials are e.g. Lotrafilcon A, Neofocon, Pasifocon, Telefocon, Silafocon, Fluorsilfocon, Paflufocon, Silafocon, Elastofilcon, Fluorofocon or Teflon AF materials, such as Teflon AF 1600 or Teflon AF 2400 which are copolymers of about 63 to 73 mol % of perfluoro-2,2-dimethyl-1,3-dioxol and about 37 to 27 mol % of tetrafluoroethylene, or of about 80 to 90 mol % of perfluoro-2,2-dimethyl-1,3-dioxol and about 20 to 10 mol % of tetrafluoroethylene.

Another group of preferred materials to be coated are amphiphilic segmented copolymers comprising at least one hydrophobic segment and at least one hydrophilic segment which are linked through a bond or a bridge member. Examples are silicone hydrogels, for example those disclosed in PCT applications WO 96/31792 and WO 97/49740.

The material to be coated may also be any blood-contacting material conventionally used for the manufacture of renal dialysis membranes, blood storage bags, pacemaker leads or vascular grafts. For example, the material to be modified on its surface may be a polyurethane, polydimethylsiloxane, polytetrafluoroethylene, polyvinylchloride, Dacron™ or a composite made therefrom.

Moreover, the material to be coated may also be an inorganic or metallic base material with or without suitable reactive groups, e.g. ceramic, quartz, or metals, such as silicon or gold, or other polymeric or non-polymeric substrates. E.g. for implantable biomedical applications, ceramics or carbohydrate containing materials such as polysaccharides are very useful. In addition, e.g. for biosensor purposes, dextran coated base materials are expected to reduce nonspecific binding effects if the structure of the coating is well controlled. Biosensors may require polysaccharides on gold, quartz, or other non-polymeric substrates.

The form of the material to be coated may vary within wide limits. Examples are particles, granules, capsules, fibres, and particularly moldings of all kinds, for example tubes, films, membranes or biomedical moldings, in particular ophthalmic moldings, such as contact lenses, intraoccular lenses or artificial cornea. Further examples of moldings are materials useful for example as wound healing dressings, eye bandages, materials for the sustained release of an active compound such as a drug delivery patch, moldings that can be used in surgery, such as heart valves, vascular grafts, catheters, artificial organs, encapsulated biologic implants, e.g. pancreatic islets, materials for prostheses such as bone substitutes, or moldings for diagnostics, membranes or biomedical instruments or apparatus.

The polymers of the invention may be applied to the bulk material surface according to processes known per se. For example, the bulk material is immersed in a solution of the polymer(s), or a layer of the polymer(s) is first of all deposited on the modified bulk material surface, for example, by dipping, spraying, printing, transfer grafting, for example, from molds, spreading, pouring, rolling, spin coating or vacuum vapor deposition, dipping or especially spraying being preferred. Most preferably, a solution comprising one or more different polymers of the invention is sprayed onto the bulk material surface which may be wet or preferably dry. According to a further preferred embodiment, the material to be coated is dipped in a solution of the polymer(s) in a solvent that is able to swell the material (swell-dipping).

Suitable solvents useful as solvents of the polymers of the invention are, for example, water, $C_1$–$C_4$-alkanols such as methanol, ethanol or iso-propanol, nitrites such as acetonitrile, tetrahydrofurane (THF), aqueous solutions comprising an alkanol, THF or the like, and also hydrocarbons, for example halogenated hydrocarbons such as methylene chloride or chloroform. The concentration of the polymer(s) in the spray solution depends on the specific compound used but is in general in the range of from 0.1 to 100 g/l, preferably 0.5 to 50 g/l, more preferably 0.5 to 25 g/l and in particular 1 to 10 g/l.

The fixation of the polymers of the invention on the bulk material surface then may be initiated, for example, by heat or preferably by irradiation, particularly by irradiation with UV or visible light. Suitable light sources for the irradiation are known to the artisan and comprise for example mercury lamps, high pressure mercury lamps, xenon lamps, carbon arc lamps or sunlight. Sensitizers may be used to shift the irradiation wavelength. In addition, a suitable filter may be used to limit the irradiation to a specific wavelength range. Preferably, the bulk material surface to which have been previously applied the polymer(s) of the invention is irradiated with light of a wavelength $\geq 300$ nm. The time period of irradiation is not critical but is usually in the range of up to 30 minutes, preferably from 10 secondes to 10 minutes, and more preferably from 15 seconds to 5 minutes, and particularly preferably from 20 seconds to 1 minute. It is advantageous to carry out the irradiation in an atmosphere of inert gas. After the polymerization, any non-covalently bonded polymers can be removed, for example by treatment, e.g. extraction, with suitable solvents, for example water, $C_1$–$C_4$-alkanols, water/$C_1$–$C_4$-alkanol mixtures or acetonitrile.

The above outlined process cycle, (i) contacting, i.e. spraying or dipping, the surface with the polymer(s) and (ii) fixing the polymer(s) on the surface, i.e. by irradiation, may be carried out once or several times. For example, 1 to 100, preferably 1 to 50 and in particular 1 to 25, different layers of one or more different polymers of the invention are added and fixed on the bulk material surface. According to a further embodiment of the invention, the step (i) of contacting, i.e. spraying or dipping, the surface with the polymer(s) is carried out several times, for example from 2 to 25 times and preferably from 2 to 10 times, and the fixation step (ii) is done only afterwards. If a process comprising several spraying or dipping steps is used, each spraying or dipping step may be carried out with the same polymer; alternatively different polymers may be used in each spraying or dipping step. For example, two or more different non-charged polymers may be used to provide a multilamellar coating; or alternating layers of a polyanionic and a polycationic polymer may be used to provide a polyelectrolyte coating.

The thickness of the polymer coating on the bulk material depends principally on the desired properties. It can be, for example, from 0.001 to 1000 μm, preferably from 0.005 to 100 μm, more preferably from 0.01 to 50 μm, even more preferably from 0.01 to 5 μm, especially preferably from 0.01 to 1 μm and particularly preferably from 0.01 to 0.5 μm.

The coated materials according to the invention and especially biomedical moldings comprising such a coating have a variety of unexpected advantages over those of the prior art which make those moldings very suitable for practical purposes, e.g. as contact lens for extended wear or intraocular lens. For example, they do have a high surface wettability which can be demonstrated by their contact angles, their water retention and their water-film break up time or on-eye pre-lens tear film break up time (TBUT).

The TBUT plays an particularly important role in the field of ophthalmic devices such as contact lenses. Thus the facile movement of an eyelid over a contact lens has proven important for the comfort of the wearer; this sliding motion is facilitated by the presence of a continuous layer of tear fluid on the contact lens, a layer which lubricates the tissue/lens interface. However, clinical tests have shown that currently available contact lenses partially dry out between blinks, thus increasing friction between eyelid and the lens. The increased friction results in soreness of the eyes and reduced movement of the contact lenses. Now it has become feasible to considerably increase the TBUT of commercial contact lenses such as, for example, nelfilcon A, vifilcon A or lotrafilcon A lenses, by applying a surface coating according to the invention. On the base curve of a contact lens, the pronounced lubricity of the coating facilitates the on-eye lens movement which is essential for extended wear of contact lenses. Moreover, the composite materials of the invention provide additional effects being essential for lenses for extended wear, such as an increased thickness of the pre-lens tear film which contributes substantially to low microbial adhesion and resistance to deposit formation. Due to the extremely soft and lubricious character of the novel surface coatings, biomedical articles such as in particular contact lenses show a superior wearing comfort including improvements with respect to late day dryness and long term (overnight) wear. The novel surface coatings moreover interact in a reversible manner with ocular mucus which contributes to the improved wearing comfort.

In addition, biomedical devices, e.g. ophthalmic devices such as contact lenses, coated by the process of the invention, have a very pronounced biocompatibility combined with good mechanical properties. For example, the devices are blood compatible and have good tissue integration. In addition, there are generally no adverse eye effects observed, while the adsorption of proteins or lipids is low, also the salt deposit formation is lower than with conventional contact lenses. Generally, there is low fouling, low microbial adhesion and low bioerosion while good mechanical properties can be for example found in a low friction coefficient and low abrasion properties. Moreover, the dimensional stability as well as the long term stability of the materials obtainable according to the invention is excellent. In addition, the attachment of a hydrophilic surface coating at a given bulk material according to the invention does not affect its visual transparency.

In summary, the ophthalmic devices obtainable by the process of the present invention, such as contact lenses, artificial cornea or intraocular lenses, provide a combination of low spoilation with respect to cell debris, cosmetics, dust or dirt, solvent vapors or chemicals, with a high comfort for the patient wearing such opthalmic devices in view of the soft hydrogel surface which for example provides a very good on-eye movement of the ohthalmic device.

Biomedical devices such as renal dialysis membranes, blood storage bags, pacemaker leads or vascular grafts cated by the process of the present invention resist fouling by proteins by virtue of the continuous layer of bound water, thus reducing the rate and extent of thrombosis. Blood-contacting devices fabricated according to the present invention are therefore haemocompatible and biocompatible.

In the examples, if not indicated otherwise, amounts are amounts by weight, temperatures are given in degrees Celsius. In general reactions involving a diazirine or azide compound are carried out in flasks or the like made of brown glassware. Tear break-up time values in general relate to the pre-lens tear film non-invasive break-up time (PLTF-NIBUT) that is determined following the procedure published by M. Guillon et al., Ophthal. Physiol. Opt. 9, 355–359 (1989) or M. Guillon et al., Optometry and Vision Science 74, 273–279 (1997). Average advancing and receding water contact angles of coated and non-coated lenses are determined with the dynamic Wilhelmy method using a Krüss K-12 instrument (Krüss GmbH, Hamburg, Germany). Wetting force on the solid is measured as the solid is immersed in or withdrawn from a liquid of known surface tension.

EXAMPLE A-1
Acrylamide Telomer ($M_n$ 2650 Da) Synthesis

A 1000 ml round bottom flask is charged with a solution of 71.1 g (1 mol) acrylamide, 4.93 g (18.2 mmol) α,α'-azodiisobutyramidine dihydrochloride and 4.93 g (36.4 mmol) cysteamin-hydrochloride in 400 ml of water. The clear and slightly yellowish solution is acidified with a few drops of hydrochloric acid to pH 3. The stirred acidic solution is evacuated to 50 mbar and filled with argon. This is repeated three times. With a constant stream of argon, this solution is poured into a 500 ml dropping funnel which is put onto an 'flow-through-reactor' consisting of an 1000 ml three-necked round-bottom flask, reflux condenser, thermometer, magnetic stirrer and a 30 cm Liebig-condenser, which is filled with glass wool. The whole apparatus is constantly purged with argon. The dropping funnel is put onto the Liebig condenser, which is heated to 65° C. The flask is heated to 60° C. The solution is slowly dropped through the Liebig-condenser into the stirred flask. This takes 2.5 hrs. During this time the temperature in the flask is kept between 58–65° C. After the completed addition, the solution is stirred for 2 hrs at 60° C.

NaOH is added to the clear and slightly yellowish solution until pH 10 is reached. The product is purified through reverse osmosis, using Millipore cartridge with a cut-off at 1000 Da and freeze-dried. A bright-white solid product is obtained ($M_n \approx 2650$ Da).

EXAMPLE A-2
N,N-dimethyl-acrylamide (DMA) Telomer Synthesis

Following the procedure described in example A-1 a mono amine-hydrochloride terminated telomer of N,N-dimetyl-acrylamide (DMA) of the molecular weight $M_n \sim 2000$ is prepared.

EXAMPLE B-1
Preparation of IEM-functionalized Acrylamide Telomer Solution 7.5 g of acrylamide telomer of Example A-1 are dissolved in 80 ml of HPLC water. Argon is then let to bubble through the solution for the period of about 30 minutes. This mixture is then added to the equimolar amount (0.81 g) of isocyanatoethyl methacrylate (IEM, isocyanate titration=6.45 mEq/g) under stirring. The whole mixture is then stirred under argon flow for 12 hours. After adding of 0.8 g of NaCl to the solution and 10 minutes stirring, the mixture is filtered through 0.45 μm Teflon filter, degassed by repeated (3×) evacuation and bubbling with argon in order to remove oxygen.

EXAMPLE B-2
Preparation of IEM-functionalized DMA Telomer Solution

The DMA telomer obtained in example A-2 is dissolved in water (HPLC grade) and adjusted to pH 10 by adding aqueous sodium hydroxide solution. Following the procedure outlined in example B-1 the primary terminal amino group thus generated is then reacted with 2-isocyanatoethylmethacrylate. After ultrafiltration and lyophilization of the resulting clear aqueous solution the macromonomer is obtained as a white powder.

EXAMPLE C
Polyacrylamide Comb Polymer Synthesis 35 g of IEM-functionalized acrylamide telomer obtained according to Example B-1 ($M_n$=2650 Da) are given into a two-necked round-bottom flask and 314 g of water are added. To the clear solution 350 mg of NaCl and 1 g of aqueous initiator solution (10.47 mg V50/ml) are added. The mixture is degassed by repeated (3×) evacuation and bubbling with argon in order to remove oxygen. The stirred mixture is heated to 80° C. for 3,5 hours before cooling down to room temperature. Dropping the solution into methanol isolates the product. The white powder is filtered off and 600 ml water are added. The viscous solution is freeze dried. The product is analyzed by size exclusion chromatography combined with laser light scattering. The weight average molecular weight $M_w$ is 7830 kDa, the number average molecular weight $M_n$ is 3040 kDa and the polydispersity is 2.6. The radius of gyration is 103 nm.

EXAMPLE D-1–D-3
Hofmann Degradation of Polyacrylamide Comb Polymer 2.47 g of comb polymer of Example C are given into a flask and 43 g water is added. The clear solution is cooled to 0° C. Amounts of NaOCl and NaOH as given in the Table are added with stirring. The reaction time is about 1 hour. Afterwards the solution is adjusted with HCl to pH 2 and the product is isolated by precipitation in 300 ml methanol. The white powder is filtered off and solved again in 100 ml water and filtered through G3. The solution is ultra filtrated (cut-off membrane 10 kDa) and freeze dried. The product is analyzed by size exclusion chromatography combined with laser light scattering, 1H-NMR and amino titration (see table).

| | Synthesis via Hofmann degradation | | | Titration and degree of amination | |
|---|---|---|---|---|---|
| Example | Amide [mmol] | NaOCl [mmol] | NaOH [mmol] | $NH_2$-group [mE/g] | % |
| D-1 | 31.1 | 1.7 | 35.0 | 0.24 | 1.9 |
| D-2 | 31.1 | 5.0 | 25.2 | 0.97 | 7.8 |
| D-3 | 31.1 | 10.1 | 50.0 | 1.64 | 13.1 |

EXAMPLE E
Synthesis of a Diazirine NHS Ester 7.06 g (36.81 mmol) N-ethyl-N'-(3-dimethylaminopropyl)carbodiimide hydrochloride are given into a 500 ml round bottom flask filled with 200 ml water at pH 12. After 15 minutes stirring at room temperature 50 ml dichlormethane are added. The extraction is repeated three times with 50 ml dichlormethane. The organic phases are combined, dried over $MgSO_4$, filtered and dried at high vacuum. The free base is given into a 250 ml round bottom flask and dissolved in 150 ml acetonitrile (28.4 ppm water). 17.19 g (~12 mmol Cl) Merrifield polymer is added. The suspension is heated to 100° C. under reflux for 16 hours. After cooling to room temperature the activated Merrifield polymer is washed 3 times with 50 ml acetonitrile, 2 times with 50 ml diethylether and dried at high vacuum.

300 mg (1.30 mmol) 4-(1-azi-2,2,2-trifluoroethyl)benzoic acid, 135 mg (1.17 mmol) N-hydroxysuccinimide, 6.3 g activated Merrifield polymer and 45 ml chloroform are given into a 100 ml brown round bottom flask and shaked at room temperature. DC control indicates complete conversion after 30 minutes. The mixture is filtered and washed with chloroform. The filtrate is dried at high vacuum. Complete reaction is determined by 1H-NMR spectroscopy.

EXAMPLE F-1
Synthesis of a Reactive Comb Polymer 0.5 g (0.49 mE/g amino hydrochloride) of comb polymer of Example D-2 are dissolved in 25 ml water and cooled to 0° C. The solution is adjusted to pH 10 and 160 mg (0.49 mmol) of the diazirine compound of Example E are added for 1 hour under stirring. Afterwards the solution is ultra filtrated using a 10 kDa cut-off membrane and then freeze dried.

EXAMPLE F-2
Synthesis of a Reactive Comb Polymer 0.5 g (0.49 mE/g amino hydrochloride) of comb polymer of Example D-2 are dissolved in 25 ml water and cooled to 0° C. The solution is adjusted to pH 10 and 87 mg (0.49 mmol) of 4-azidophenyl isothiocyanate are added for 1 hour under stirring. Afterwards the solution is ultra filtrated using a 10 kDa cut-off membrane and then freeze dried.

EXAMPLE G-1
Spray Coating of Contact Lenses

An aqueous solution of 2 mg/ml reactive comb polymer of Example F-2 is given into a funnel of an airbrush aero-pro 381™ (Hansa). The solution is sprayed on both sides of lotrafilcon A contact lenses (polysiloxane/perfluoroalkylpolyether copolymer) for 5 seconds using a nitrogen pressure of 1.2 bar. Afterwards the lenses are irradiated 30 seconds using UV LQ 400B lamp (Gröbel) with an intensity of 1.29 mW/cm$^2$ and a 305 nm cutoff filter. The lenses are extracted in water overnight and then autoclaved. The wettability is monitored by dynamic contact angle measurements leading to advancing and receding contact angle of 20° and 0°.

EXAMPLE G-2
Spray Coating of Contact Lenses

An aqueous solution of 1 mg/ml reactive comb polymer of Example F-1 is given into a funnel of an airbrush aero-pro 381™ (Hansa). The solution is sprayed on both sides of lotrafilcon A contact lenses for 5 seconds using a nitrogen pressure of 1.2 bar. Afterwards the lenses are irradiated 60 seconds using an EFOS blue light lamp. The lenses are extracted in water overnight and then autoclaved. The wettability is monitored by dynamic contact angle measurements leading to advancing and receding contact angle of 15° and 0°.

EXAMPLE G-3
Dip Coating of Contact Lenses

Lotrafilcon A lenses are dipped into an aqueous solution of 0.1 mg/ml reactive comb polymer of Example F-1 for 5 minutes under stirring. Afterwards the lenses are irradiated 60 seconds using an EFOS blue light lamp. The lenses are extracted in water overnight and then autoclaved. The wettability is monitored by dynamic contact angle measurements leading to advancing and receding contact angle of 0° and 0°.

EXAMPLE G-4
Dip Coating of Contact Lenses

Lotrafilcon A lenses are dipped into an aqueous solution of 0.1 mg/ml reactive comb polymer of Example F-2 for 5 minutes under stirring. Afterwards the lenses are irradiated 30 seconds using UV LQ 400B lamp (Gröbel) with an intensity of 1.29 mW/cm² and a 305 nm cutoff filter. The lenses are extracted in water overnight and then autoclaved. The wettability is monitored by dynamic contact angle measurements leading to advancing and receding contact angle of 10° and 0°.

EXAMPLE H
Preparation of a Comb Polymer 5.7 g (100 mVal NH$_2$) of poly-allylamine (M$_w$~70 000) are dissolved in 100 ml of dist. water and 64.8 g (200 mMoles) of lactobionolactone are added. The mixture is stirred at room temperature for 48 hrs and heated to 40° C. for 8 hrs. After removal of unreacted or hydrolysed lactone from the solution through ultrafiltration (cut-off membrane 1000 Da) the titration of residual amino groups shows a conversion of 53%. The remaining primary amino groups on the polymer are quenched by addition of 22.2 g (300 mMoles) of glycidol. To achieve complete conversion the reaction mixture is stirred at room temperature for 12 hrs. and then at 40° C. for another 8 hrs. After excessive glycidol has been removed from the solution by ultrafiltration as before the product is free of amine. A white powdery product is obtained after lyophilization and vacuum drying at 0, 001 Torr. GPC analysis in water shows a molecular weight of the polymer of Mw ~390 kDalton.

EXAMPLE J
Preparation of a Photoreactive Comb Polymer 3.6 g of the polymer of Example H are suspended in 100 ml of dry DMSO and are stirred at 60° C. for 6 hrs. in order to achieve sufficient swelling of the polymer. After cooling of the suspension to 25° C. 0.18 g (5% w/w) of 4-(2,2,2-trifluoro-1-diazirinyl-ethyl)-phenyliso-cyanate and 20 mg of dibutyl-ti-dilaurate are added. The mixture is stirred at 40° C. for 6 hrs. and then precipitated in diethylether. The slightly yellowish product obtained is 3-times extracted with 30 ml of boiling diethylether and then dryed at 0,001 Torr and 40° C.

EXAMPLE K-1
N-methacryloyl-,N'-[4-(2,2,2-trifluoro-1-diazirinyl-ethyl)-benzoy]-1,3-diamino-propane In a 3-necked 50-ml brown-glass reaction bottle equipped with magnetic stirr bar, dropping funnel, thermometer and reflux condenser 1 g (3.05 mMoles) of the N-hydroxysuccinamide-ester of 4-[2,2,2-trifluoro-1-(diazirinyl-3)-ethyl]-benzoic acid (prepared according to the procedure outlined in Example E) and 0.546 g (3.05 mMoles) N-(3-aminopropyl)-methacrylamide hydrochloride (APMAH) are suspended under a blanket of dry nitrogen in 20 ml of dry ethyl acetate. Over a period of 10 minutes a solution of 0.310 g (3.06 mMoles) dry triethylamine in 5 ml of ethyl acetate is then added to the mixture. The white suspension formed was stirred at room temperature for 12 hrs., filtered through a glass filter funnel under exclusion of light. After evaporation of the solvent and recrystallization from a THF/n-hexane 1:3 mixture a white crystalline solid is obtained. The structure and the purity of the product is confirmed by the 1H-NMR spectrum; the signals at 7.25/7,9 ppm and 5.38/5.78 ppm correspond to the presence of the aromatic ring and of the methacrylic group.

EXAMPLE K-2
N-(4-azido-phenyl),N'-(2-methacryloyloxy)-ethyl-urea

Following the procedure outlined in example K-1 2.36 g (13.9 mMoles) of 4-azido-aniline hydrochloride and 2.15 g (13.9 mMoles) of 2-isocyanatoethyl-methacrylate (IEM) are dissolved in 20 ml of dry pyridine. Then 7.03 g (69.5 mMoles) of dry triethylamine are added over a period of 20 minutes, and the mixture is stirred at room temperature for 12 hrs. After cooling to −18° C. the dark suspension formed is filtered, and the solvent is evaporated. The residue is recrystallized from a CH$_2$Cl$_2$/n-hexane 1:3 mixture to obtain a light-beige colored crystalline product. The 1H-NMR spectrum confirms the structure of the compound, and it's purity is confirmed by elemental analysis:

Calculated: C 53.97%; H 5.23%; N 24.21%; O 16.59%;
Found: C 53.92%; H 5.35%; N 23.83%; O 16.59%.

EXAMPLE K-3

The procedure of Examples K-1 is repeated using an equivalent amount of 4-azidophenyl-isothiocyanate instead of the compound of Example E.

EXAMPLE K-4

The procedure of Examples K-1 is repeated using an equivalent amount of 4-(2,2,2-trifluoro-1-diazirinyl-ethyl)-phenylisocyanate instead of the compound of Example E.

EXAMPLE L-1
Cotelomerization of a Photoreactive Monomer with N,N-dimethyl Acrylamide (DMA)

A 250 ml brown-glas, three-necked reaction flask equipped with thermometer, stirrer, dropping funnel and reflux condenser is carefully purged with Argon and kept under an Argon blanket during the telomerization reaction. The flask is then charged with 10 ml of a degassed solution of 0,36 g (1.25 mMoles) of the azide-containing monomer prepared in example K2, 12.5 g (125 mMoles) of DMA, 0.94 g (8.81 mMoles) of cysteamine hydrochloride and 100.4 mg (0.632 mMoles) of AIBN in 70 ml of acetonitrile which has been set to pH-4 using 0.01 N aqueous HCl. After heating the reaction flask to 60° C. the remaining 60 ml of the solution are added to the reaction mixture over a period of 30 minutes while keeping the reaction temperature constant. After 4 hrs. at 60° C. the mixture is cooled to 25° C., filtered through a glass filter funnel, and the solvent is evaporated. The residue is dissolved in 200 ml of dist. water and is then purified by ultrafiltration using a membrane with a cut-off of 1000 Dalton. After lyophilization of the purified solution the co-telomer is obtained as white powder.

EXAMPLE L-2
Cotelomerization of a Photoreactive Monomer with N,N-dimethyl Acrylamide (DMA)

Following the procedure outlined in example L-1, 12.5 g (125 mMoles) of DMA are co-telomerized with 0.62 g (1.25 mMoles) of the diazirine-containing monomer prepared in example K1 and 0.94 g (8.31 mMoles) of cysteamine hydrochloride using 70 ml of toluene as a solvent. After ultrafiltration and lyophilization the co-telomer is obtained as a white powder.

EXAMPLE M-1
Synthesis of a Polymerizable Photoreactive Cotelomer

In a 100 ml brown-glass reaction flask equipped with magnetic stirr bar and Argon inlet 4 g of the diazirine-containing co-telomer prepared in example L-2 are dissolved in 50 ml of dist. water, and 0.45 g of 2-isocyanatoethyl methycrylate (IEM) are added under vigorous stirring at 5° C. After setting the pH of the mixture to 10 using 0.1 N aqueous NaOH solution stirring is continued at room temperature for 3 hrs. The aqueous solution of the macromonomer is then purified by ultrafiltration as described in example L1 and lyophilized. A white powder is obtained. According to the GPC analysis the product shows a number average molecular weight $M_n$ of 2800 Dalton and microtitration of of it's aqueous solution proves that the chloride and the amine contents are both below 0.001 mVal. The methacrylic head group of the macomonomer can clearly be identified in the 1H-NMR spectrum.

EXAMPLE M-2
Synthesis of a Photoreactive Macromonomer

Following the procedure described in example M-1, 4 g of the co-telomer prepared in example L1 are reacted with 0.3 g acryloylchloride. After lyophilization the macromonomer is obtained as a white powder. The number average molecular weight $M_n$ of the N-acryloyl-terminated co-telomer is found by GPC analysis to be 2680 Dalton.

EXAMPLE M-3
Synthesis of a Photoreactive Macromonomer

As outlined in example M-1, 12.5 g of the cotelomer of Example L-2 are reacted with 970 mg of 2-isocyanatoethylmethacrylate using 25 g dry acetonitrile as a solvent instead of water. 640 mg of triethylamine are added to the reaction mixture for neutralization of the terminal amine hydrochloride function of the cotelomer. After stirring for 8 hrs. at room temperature the total conversion of the isocyanate is confirmed by IR spectroscopy. After precipitation in 250 ml of diethylether the product is obtained as a white powder. For purification the material is dissolved in water and dialysed using a membrane of 1000 Da cut-off. After lyophilization of the remaining clear, colourless solution the white powdery macromonmer containing 1 mole-% diazirine is obtained. Titration of the terminal methacrylic function and GPC analysis show molecular weights of $M_n$ ~2200 and $M_w$ ~3500.

EXAMPLE N-1
Homopolymerization of a Photoreactive Macromonomer 3.5 g of the macromonomer prepared in example M1 and 0.1 g of an aequeous solution of α,α'-azodiisobutyramidine dihydrochloride (10.5 mg/ml) are dissolved in 30 ml of dist.water and then carefully degassed. The mixture is stirred and polymerized at 60° C. for 8 hours. The "comb-type" polymer solution obtained is purified from residual macromonomer and from oligomers by ultrafiltration using a membrane with a molecular weight cut-off of 10 000 Dalton. After lyophilization of the aqueous solution a white polymer is obtained. The product is characterized by 1H-NMR in $D_2O$, by GPC-analysis with on line light scattering in water. The weight average molecular weight $M_w$ of the diazirine-containing comb-type polymer obtained is found to be 155 00 Dalton.

EXAMPLES N-2–N-3
Copolymerization of a Photoreactive Macromonomer

Following the procedure outlined in example N-1 the diazirine-containing macromonomer prepared in example M-3 (I) is copolymerized with the DMA macromonomer prepared in example B-2 (II) in different molar ratios as outlined in the Table.

| Ex. No. | Molar Ratio (I)/(II) | Yield | $M_n$: $10^6$ Da | $M_w$: $10^6$ Da |
|---|---|---|---|---|
| N-2 | 50/50 | 83% | 6,3 | 14,7 |
| N-3 | 10/90 | 69% | 9,2 | 19,7 |

EXAMPLE O-1–O-5
UV-Linking of a Photoreactive Comb-type Polymer to a Contact Lens Surface 2 g of the diazirine-containing polymer prepared in Example N-1 are dissolved in 50 ml of water (HPLC grade). The solution is used for spray or dip coating of lotrafilcon A contact lenses (Ciba Vision, Atlanta) with subsequent UV-initiated covalent fixation of the photo-reactive polymer as described in Examples G1 or G3. The coated contact lenses are then autoclaved for 20 minutes at 121° C., and the lens surfaces are characterized by measurement of the dynamic contact angles.

| Ex. No. | Dip/Spray | Irradiation time [sec] | Cycles | Contact Angles ° adv./° rec. |
|---|---|---|---|---|
| O-1 | Dip | 60 | 1 | 63/41 |
| O-2 | Dip | 60 | 3 | 16/0 |
| O-3 | Dip | 120 | 3 | 0/0 |
| O-4 | Spray | 60 | 3 | 11/0 |
| O-5 | Spray | 60 | 5 | 0/0 |

EXAMPLES O-6–O-7
UV-Linking of a Photoreactive Comb Polymer to a Contact Lens Surface Following the procedure outlined in Examples O-1–O-5, 2 g of the polymer prepared in Example J are dissolved in water, and the solution is used for the dip/UV -Link coating of lotrafilcon A contact lenses as described in Example G-3. A UV irradiation time of 60 seconds is used.

| Ex. No. | Irradiation time [sec] | Cycles | Contact Angles ° adv./° rec. |
|---|---|---|---|
| O-6 | 60 | 1 | 12/0 |
| O-7 | 60 | 2 | 0/0 |

EXAMPLES O-8–O-9
UV-Linking of a Photoreactive Comb Copolymer to a Contact Lens Surface Using the procedure outlined in examples O6–O-7 a 5% w/w aqueous solution of the photoreactive bottlebrush copolymer prepared in example N-3 is employed for the coating of lotrafilcon A contact lenses. The wettability of the lenses after autoclaving is characterized by dynamic contact angle measurements.

| Ex. No | Irradiation Time [sec.] | Cycles | Contact Angles ° adv./° rec. |
|---|---|---|---|
| O-8 | 60 | 1 | 22/0 |
| O-9 | 60 | 3 | 17,5/1,5 |

What is claimed is:

1. A process for coating a material surface comprising the steps of:

(a) applying to the material surface at least one comb-type polymers comprising a polymer backbone and side chains pendently attached thereto, wherein at least a part of the side chains carry a triggerable preccursor for carbene or nitrene formation, wherein the comb-type polymer comprises units of formula

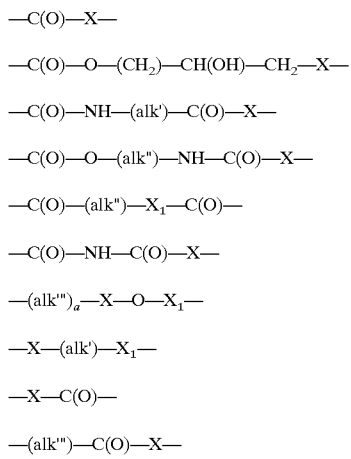

(1)

wherein R is hydrogen or $C_1$–$C_4$-alkyl,

A is a radical of formula

—C(O)—X— (2a),

—C(O)—O—(CH$_2$)—CH(OH)—CH$_2$—X— (2b),

—C(O)—NH—(alk')—C(O)—X— (2c),

—C(O)—O—(alk")—NH—C(O)—X— (2d),

—C(O)—(alk")—X$_1$—C(O)— (2e),

—C(O)—NH—C(O)—X— (2f),

—(alk''')$_a$—X—O—X$_1$— (2g),

—X—(alk')—X$_1$— (2h),

—X—C(O)— (2i),

—(alk''')—C(O)—X— (2j), or

—(alk''')—X—C(O)— (2k), wherein (alk') is $C_1$–$C_6$-alkylene, (alk") is $C_2$–$C_{12}$-alkylene, (alk''') is $C_1$–$C_9$-alkylene, D is a group —C(O)— or —C(S)— and ε is 0 or 1, X and $X_1$ are each independently a group —O— or —NR$_1$—, wherein $R_1$ is hydrogen or $C_1$–$C_4$-alkyl, (oligomer$^1$) is the radical of
  (i) a hydrophilic telomer which is derived from one or more different copolymerlzable vinyl monomers,
  (ii) the radial of an oligosaccharide,
  (iii) the radical of an oligopeptide, or
  (iv) the radical of a polyalkylene oxide, Q is a radical comprising a triggerable precursor for carbene or nitrene formation, r is an integer from 1 to 4; and m is an integer $\geq 1$;

(b) fixing the polymer(s) onto the material surface using UV or visible light.

2. A process according to claim 1, wherein the radical -(oligomer$^1$)-(Q)$_m$ corresponds to a radical of formula

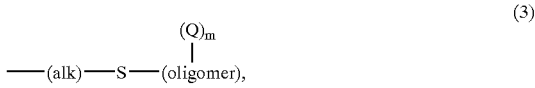

(3)

wherein (alk) is $C_2$–$C_6$-alkylene and (oligomer)-(Q)$_m$ corresponds to formula

(3a)

wherein B and B' are each independently of the other a radical of formula

(4a)

(4b)

wherein $R_{25}$ is hydrogen or $C_1$–$C_6$-alkyl, $R_{26}$ is a hydrophilic substituent; $R_{27}$ is $C_1$–$C_4$-alkyl, phenyl or a radical —C(O)OY$_9$, wherein $Y_9$ is hydrogen or unsubstituted or hydroxy-substituted $C_1$–$C_4$-alkyl; and $R_{26}$ is a radical —C(O)OY$_9$' or —CH$_2$—C(O)OY$_9$' wherein Y$_9$' independently has the meaning of Y$_9$;

B"—Q is a 1,2-ethylene radical of formula

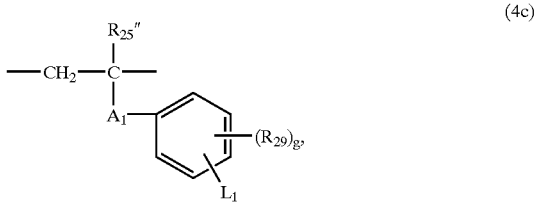

(4c)

wherein $R_{26}$" is hydrogen or $C_1$–$C_6$-alkyl, $A_1$ is a linking member of formula —C(O)—X'— (6a), —(CH$_2$)$_t$—X'—C(O)— (6b), —C(O)—X'—(Alk)—X$_4$—C(O)— (6c), —(CH$_2$)$_t$—X'—D$_1$—NH— (6d), or —(CH$_2$)$_{t1}$—X'—CH$_2$—CH(OH)—CH$_2$— (6f), X' and $X_2$ are each independently a group —O— or —NR$_1$'—, $R_1$' is hydrogen or $C_1$–$C_4$-alkyl; $D_1$ is a group —C(O)— or —C(S)—, (Alk) is $C_2$–$C_{12}$-alkylene, t is 0 or 1, $R_{29}$ is $C_1$–$C_4$-alkyl, $C_1$–$C_6$-alkoxy, amino, hydroxy, sulfo, nitro, trifluoromethyl or halogen, g is an integer from 0 to 2, $L_1$ is a group of formula

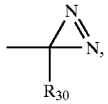 (7a)

—$N_3$ (7b)

$R_{30}$ is fluorinated $C_1$–$C_8$-alkyl, p and q are each independently of another an integer from 0 to 250, wherein the total of (p+q) is an integer from 2 to 250, m is an integer from 1 to 3, and T is a monovalent group that is suitable to act as a polymerization chain-reaction terminator.

3. A process according to claim 2, wherein B and B' are each independently a radical of formula (4a), $R_{25}$ is hydrogen or methyl, and $R_{26}$ is a radical —$CONH_2$, —$CON(CH_3)_2$,

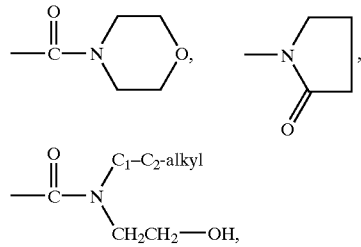

—CONH—$(CH_2)_2$—OH, —COO$(CH_2)_{2-4}$—NHC(O)—O—G, wherein —O—G is the radical of trehalose, —COOH, —$NH_2$, —$CH_2$—$NH_2$, —$CH_2$—$N(CH_3)_2$, —C(O)NH—$(CH_2)_{2-3}$—$NH_2$, —C(O)O—$(CH_2)_{2-3}$—$NH_2$, —COO—$(CH_2)_2$—$N(CH_3)_2$ or —C(O)O—$CH_2$—CH(OH)—$CH_2$—$N(CH_3)_3^*$ $An^-$, wherein $An^-$ is an anion.

4. A process according to claim 3, wherein in the polymer units of formula (1) R is hydrogen or methyl, A is a radical of formula —C(O)—X— (2a), —C(O)—O—(alk'')—NH—C(O)—X— (2d), (alk'') is $C_2$–$C_4$-alkylene; X is —NH—; and (oligomer$^1$)-$(Q)_m$ is a telomer radical of formula

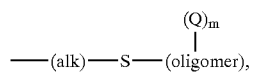 (3)

wherein (alk) is $C_2$–$C_4$-alkylene and (oligomer)-$(Q)_m$ corresponds to formula

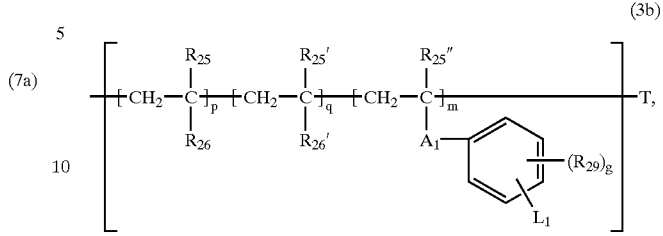 (3b)

wherein $R_{25}$, $R_{25}'$ and $R_{25}''$ are each independently hydrogen or methyl, $R_{26}$ is a radical —$CONH_2$, —$CON(CH_3)_2$ or N-pyrrolidonyl, $R_{29}'$ is —$NH_2$ or —C(O)X'—(Alk)—$NH_2$, X' is —O— or —NH—, (Alk) is $C_2$–$C_3$-alkylene, $A_1$ is a radical —NH—C(O)— or —C(O)—NH—$(CH_2)_{2-4}$—NH—C(O)—, g is 0, $L_1$ is a radical

or —$N_a$, p and q are each independently an integer from 0 to 150, wherein the total of (p+q) is an integer from 2 to 150, m is an integer from 1 to 3, and T is a monovalent group that is suitable to act as a polymerization chain-reaction terminator.

5. A process for coating a material surface, comprising the steps of:

(a) applying to the material surface at least one comb-type polymer comprising a polymer backbone and side chains pendently attached thereto, wherein at least a part of the side chains carry a triggerable precursor for carbene or nitrene formation, wherein the comb-type polymer is a polymer comprising units of formula

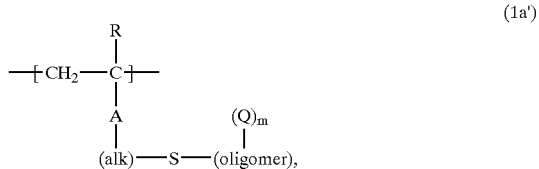 (1a')

and optionally

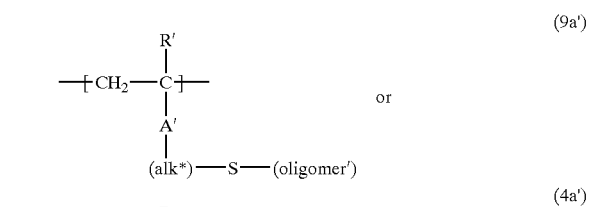 (9a')

or

 (4a')

wherein R, R' and $R_{26a}$ are each independently hydrogen or methyl, $R_{26a}$ is a radical —$CONH_2$, —$CON(CH_3)_2$ or N-pyrrolidonyl, A and A' are each independently a radical of —C(O)—X— (2a), —C(O)—NH—(alk')—C(O)—X— (2c), —C(O)—O—(alk")—NH—C(O)—X— (2d), —X—C(O)— (2f)

or

—(alk''')—X—C(O)— (2k)

wherein X is a group —O— or —NH—, (alk)" is $C_2$–$C_4$-alkylene, (alk') is a radical —$CH_2$— or —$C(CH_2)_2$—, (alk''') is $C_1$–$C_2$-alkylene, (alk) and (alk') are each independently $C_2$–$C_4$-alkylene, (oligomer)-$(Q)_m$ is a radical of formula

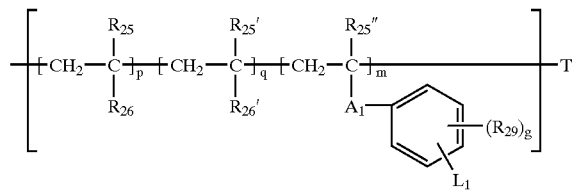

(3b)

wherein $R_{25}$, $R_{26}'$ and $R_{26}"$ are each independently hydrogen or methyl, $R_{26}$ is a radical —$CONH_2$, —$CON(CH_2)_2$ or N-pyrrolidonyl, $R_{26}'$ is —$NH_2$ or —C(O)X'-(Alk)-$NH_2$, X' is —O— or —NH—, (Alk) is $C_2$–$C_3$-alkylene, $A_1$ is a radical —NH—C(O)— or —C(O)—NH—$(CH_2)_{2-4}$—NH—C(O)—, g is 0, $L_1$ is a radical

or —$N_a$, p and q are each independently an integer from 0 to 150, wherein the total of (p+q) is an integer from 2 to 150, m is an integer from 1 to 3, and T is a monovalent group that is suitable to act as a polymerizatton chain-reaction terminator, and (oligomer$^1$) is a radical of formula

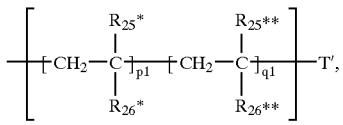

(3d')

wherein $R_{25}*$ and $R_{25}**$ are each independently hydrogen or methyl, $R_{26}*$ and $R_{26}**$ are each independently a radical —$CONH_2$, —$CON(CH_3)_2$ or N-pyrrolidonyl, p1 and q1 are each independently an integer of from 0 to 150 and the total of (p1+q1) is an integer from 2to 150, and T' is a monovalent group that is suitable to act as a polymerization chain-reaction terminator.

6. A process according to claim 5, wherein the comb-type polymer according to step (a) essentially consists of units of formula (1a').

7. A process according to claim 5, wherein the comb-type polymer according to step (a) essentially consists of units of formula (1a') and optionally (9a').

8. A process according to claim 1, wherein the material surface to be coated is the surface of a contact lens, intraocular lens or artificial cornea.

9. A composite material comprising (I) an inorganic or organic bulk material; and (II) a hydrophilic surface coating obtained by the process according to claim 5.

* * * * *